（12） United States Patent
Hong et al.

(10) Patent No.: US 12,346,251 B2
(45) Date of Patent: Jul. 1, 2025

(54) STORAGE DEVICE, SYSTEM INCLUDING STORAGE DEVICE AND METHOD OPERATING STORAGE DEVICE

(71) Applicant: SAMSUNG ELECTRONICS CO., LTD., Suwon-si (KR)

(72) Inventors: Wongi Hong, Seoul (KR); Chulho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1 day.

(21) Appl. No.: 17/895,236

(22) Filed: Aug. 25, 2022

(65) Prior Publication Data

US 2023/0297505 A1    Sep. 21, 2023

(30) Foreign Application Priority Data

Mar. 16, 2022  (KR) .................. 10-2022-0032548

(51) Int. Cl.
*G06F 12/00* (2006.01)
*G06F 12/0802* (2016.01)

(52) U.S. Cl.
CPC .... *G06F 12/0802* (2013.01); *G06F 2212/271* (2013.01)

(58) Field of Classification Search
CPC .................. G06F 12/0802; G06F 2212/271
See application file for complete search history.

(56) References Cited

U.S. PATENT DOCUMENTS

| | | | |
|---|---|---|---|
| 6,374,331 B1 | 4/2002 | Janakiraman et al. | |
| 8,732,396 B2 | 5/2014 | Bert | |
| 8,838,885 B2 | 9/2014 | Kwak et al. | |
| 10,204,047 B2 | 2/2019 | Diamand et al. | |
| 10,635,588 B2 | 4/2020 | Eckert et al. | |
| 11,036,658 B2 | 6/2021 | Kalyanasundharam et al. | |
| 11,106,584 B2 | 8/2021 | Chachad et al. | |
| 2011/0185128 A1* | 7/2011 | Ukai ................... | G06F 12/0822 711/146 |
| 2014/0040411 A1* | 2/2014 | Weber .................. | G06F 3/0607 709/212 |
| 2017/0228012 A1* | 8/2017 | Shirota ................... | G06F 1/329 |
| 2018/0239542 A1* | 8/2018 | Kang ...................... | G06F 3/064 |

* cited by examiner

*Primary Examiner* — Arvind Talukdar
(74) *Attorney, Agent, or Firm* — Fish & Richardson P.C.

(57) ABSTRACT

A storage device includes; a first memory subsystem including a first nonvolatile memory device (NVM), a first storage controller configured to control operation of the first NVM, and a first resource, and a second memory subsystem including a second NVM, a second storage controller configured to control operation of the second NVM, and a second resource, wherein the first resource is a shared resource useable by the second memory subsystem, and the second resource is shared resource useable by the first memory subsystem.

16 Claims, 15 Drawing Sheets

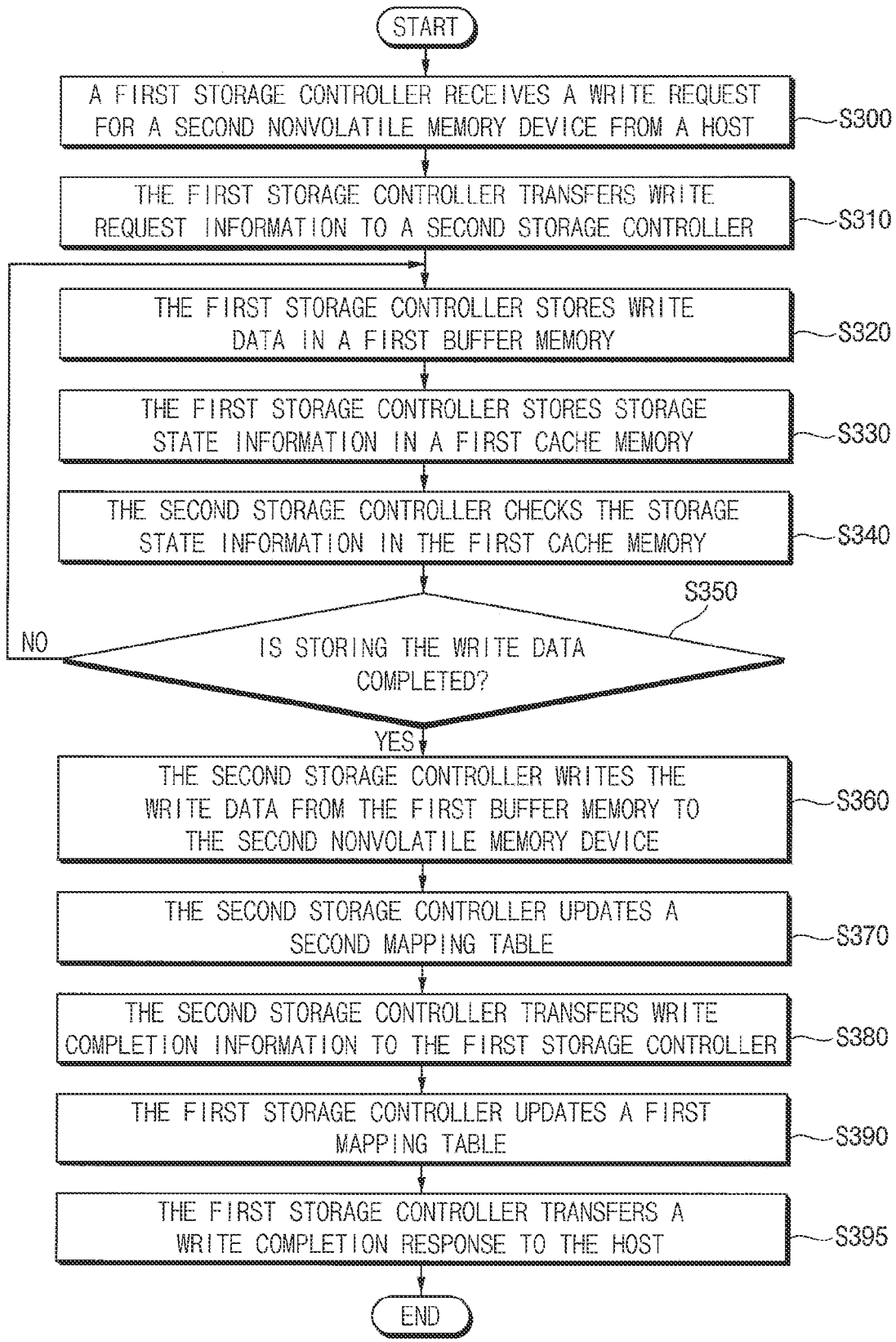

FIG. 5A
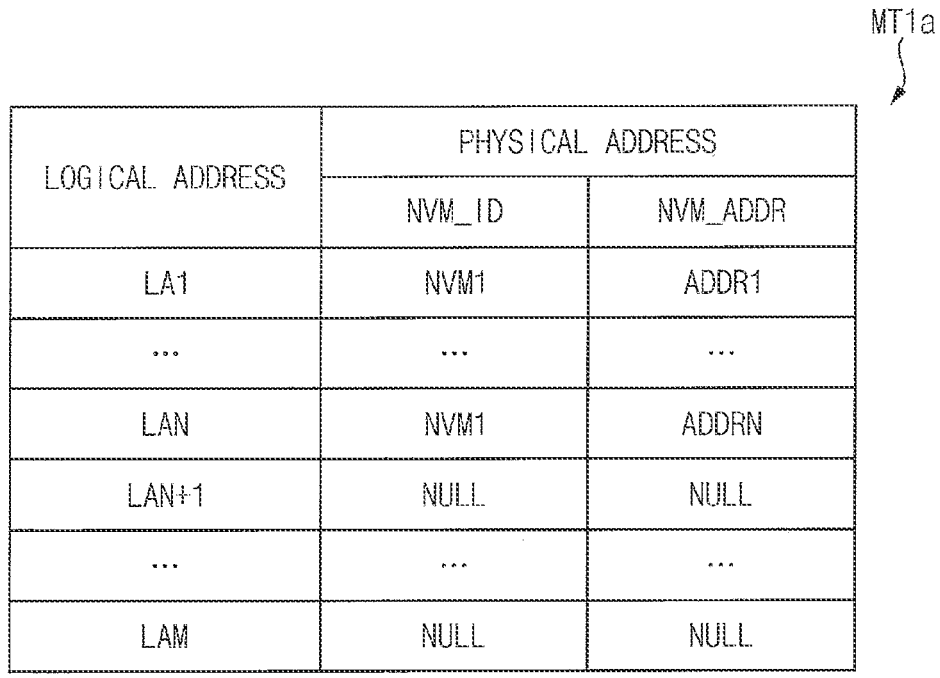
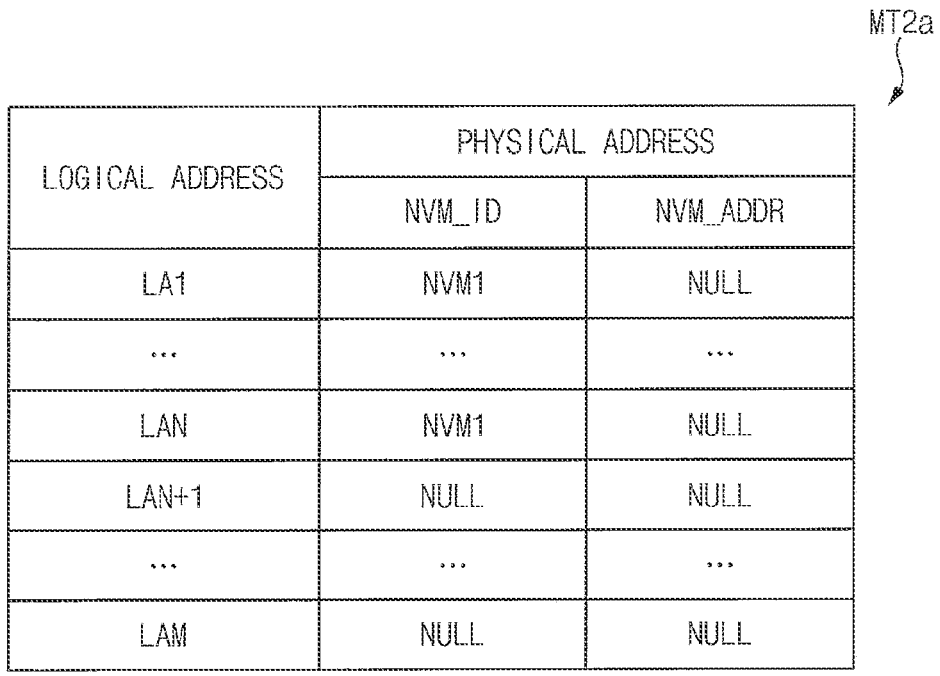

| LOGICAL ADDRESS | PHYSICAL ADDRESS | |
|---|---|---|
| | NVM_ID | NVM_ADDR |
| LA1 | NVM1 | ADDR1 |
| ... | ... | ... |
| LAN | NVM1 | ADDRN |
| LAN+1 | NVM2 | NULL |
| ... | ... | ... |
| LAM | NVM2 | NULL |

MT2b

| LOGICAL ADDRESS | PHYSICAL ADDRESS | |
|---|---|---|
| | NVM_ID | NVM_ADDR |
| LA1 | NVM1 | NULL |
| ... | ... | ... |
| LAN | NVM1 | NULL |
| LAN+1 | NVM2 | ADDRN+1 |
| ... | ... | ... |
| LAM | NVM2 | ADDRM |

F I G. 8
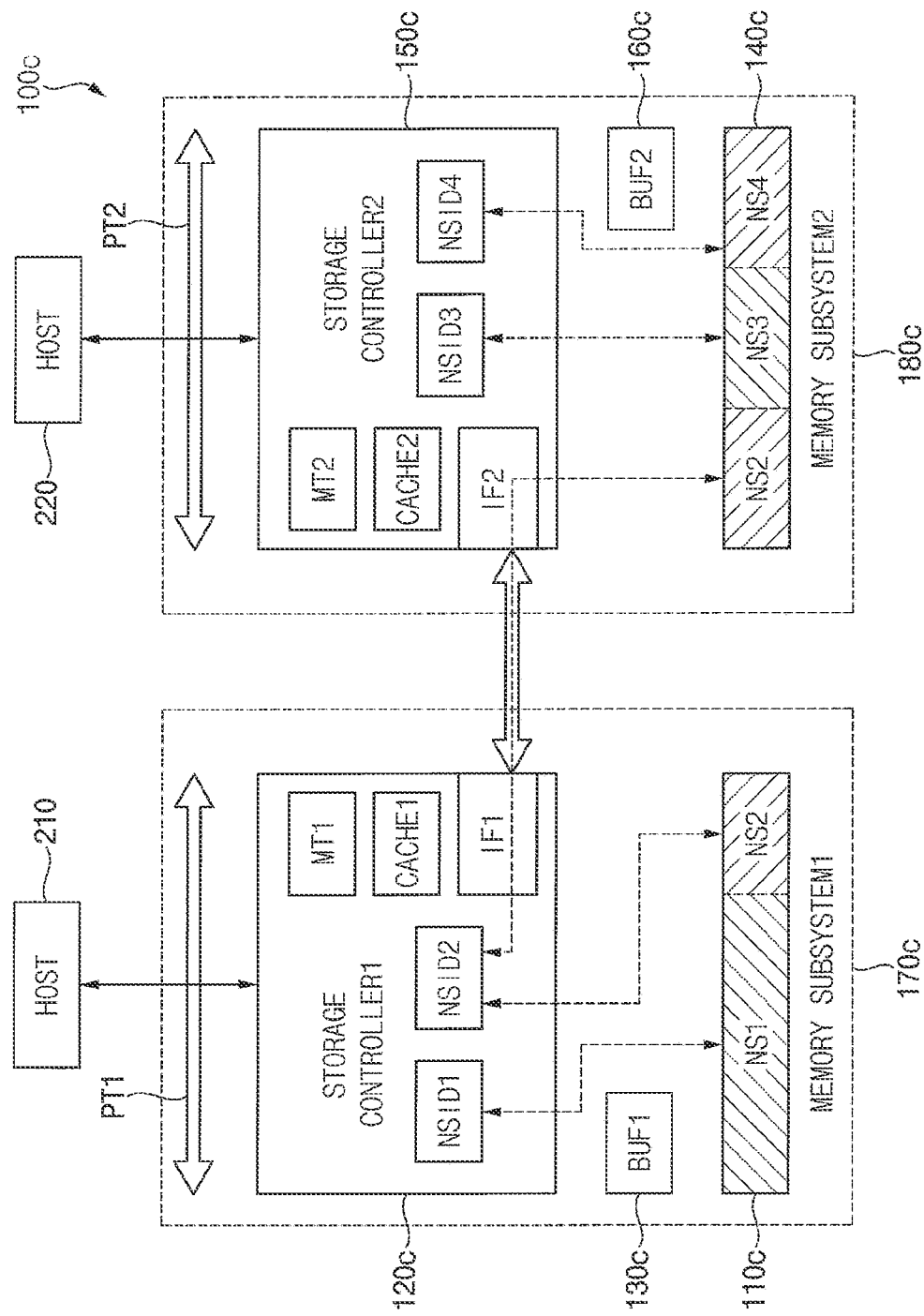

STORAGE DEVICE, SYSTEM INCLUDING STORAGE DEVICE AND METHOD OPERATING STORAGE DEVICE

CROSS-REFERENCE TO RELATED APPLICATION

This application claims priority under 35 USC § 119 to Korean Patent Application No. 10-2022-0032548 filed on Mar. 16, 2022 in the Korean Intellectual Property Office, the subject matter of which is hereby incorporated by reference in its entirety.

BACKGROUND

1. Technical Field

Embodiments of the inventive concept relate generally to semiconductor integrated circuits, and more particularly to storage devices including one or more NVM(s), as well as methods of operating such storage devices.

2. Description of the Related Art

A great variety of storage devices have been proposed, wherein the storage device includes at least one nonvolatile memory device (hereafter, "NVM") and a storage controller controlling the NVM. Here, the storage controller may be used to control the execution of various data access operations (e.g., read operations and write operations) by the NVM in response to corresponding requests received from a host.

Memory systems and constituent storage devices are designed in relation to various performance criteria (e.g., memory system performance criteria, storage device performance criteria, storage controller capabilities, memory design, etc.). Accordingly, storage controllers have been uniquely and individually designed for use within a storage device according to a various performance criteria.

SUMMARY

Embodiments of the inventive concept provide storage devices including a readily scalable storage controller, as well as methods of operating such storage devices.

In some embodiments, the inventive concept provides a storage device including: a first memory subsystem including a first nonvolatile memory device (NVM), a first storage controller configured to control operation of the first NVM, and a first resource, and a second memory subsystem including a second NVM, a second storage controller configured to control operation of the second NVM, and a second resource, wherein the first resource is a shared resource useable by the second memory subsystem, and the second resource is shared resource useable by the first memory subsystem.

In other embodiments, the inventive concept provides; a method of operating a storage device including a first memory subsystem including a first nonvolatile memory device (NVM), a first storage controller configured to control operation of the first NVM, a cache memory, a first buffer memory and a first mapping table, and a second memory subsystem including a second NVM, a second storage controller configured to control operation of the second NVM, a second cache memory, a second buffer memory and a second mapping table. The method includes; receiving a write request including write data in the first storage controller directed to memory cell in the second NVM, using the first storage controller to write the write data in the first buffer memory, and thereafter, using the second storage controller to write the write data stored in the first buffer memory in the second NVM.

In still other embodiments, the inventive concept provides; a system including; a host, and a storage device connected to the host and operating under the control of the host. The storage device includes; a first memory subsystem including a first nonvolatile memory device (NVM), a first storage controller configured to control operation of the first NVM, a first cache memory, a first buffer memory and a first mapping table, and a second memory subsystem including a second NVM, a second storage controller configured to control operation of the second NVM, a second cache memory, a second buffer memory and a second mapping table. Upon receiving a write request including write data from the host in the first storage controller, the first storage controller is configured to transfer write request information associated with the write request to the second storage controller, store the write data in the first buffer memory, and store first storage state information indicating that the write data are stored in the first buffer memory in the first cache memory, and the second storage controller is configured to check the first storage state information stored in the first cache memory in response to the write request information, and write the write data from the first buffer memory to the second NVM in response to the first storage state information.

BRIEF DESCRIPTION OF THE DRAWINGS

Advantages, benefits and features, as well as the making and use of the inventive concept, may be more clearly understood upon consideration of the following detailed description together with the accompanying drawings, in which:

FIG. 4 is a flowchart illustrating a method of writing data in a storage device according to embodiments of the inventive concepts;

FIGS. 5A and 5B are respective diagrams variously illustrating first and second mapping tables in relation to a data write operation;

FIGS. 7 and 8 are respective block diagrams illustrating various storage devices connected to a host in a system according to embodiments of the inventive concept;

DETAILED DESCRIPTION

Throughout the written description and drawings, like reference numbers and labels are used to denote like or similar elements, components, features and/or method steps.

Figure 1:
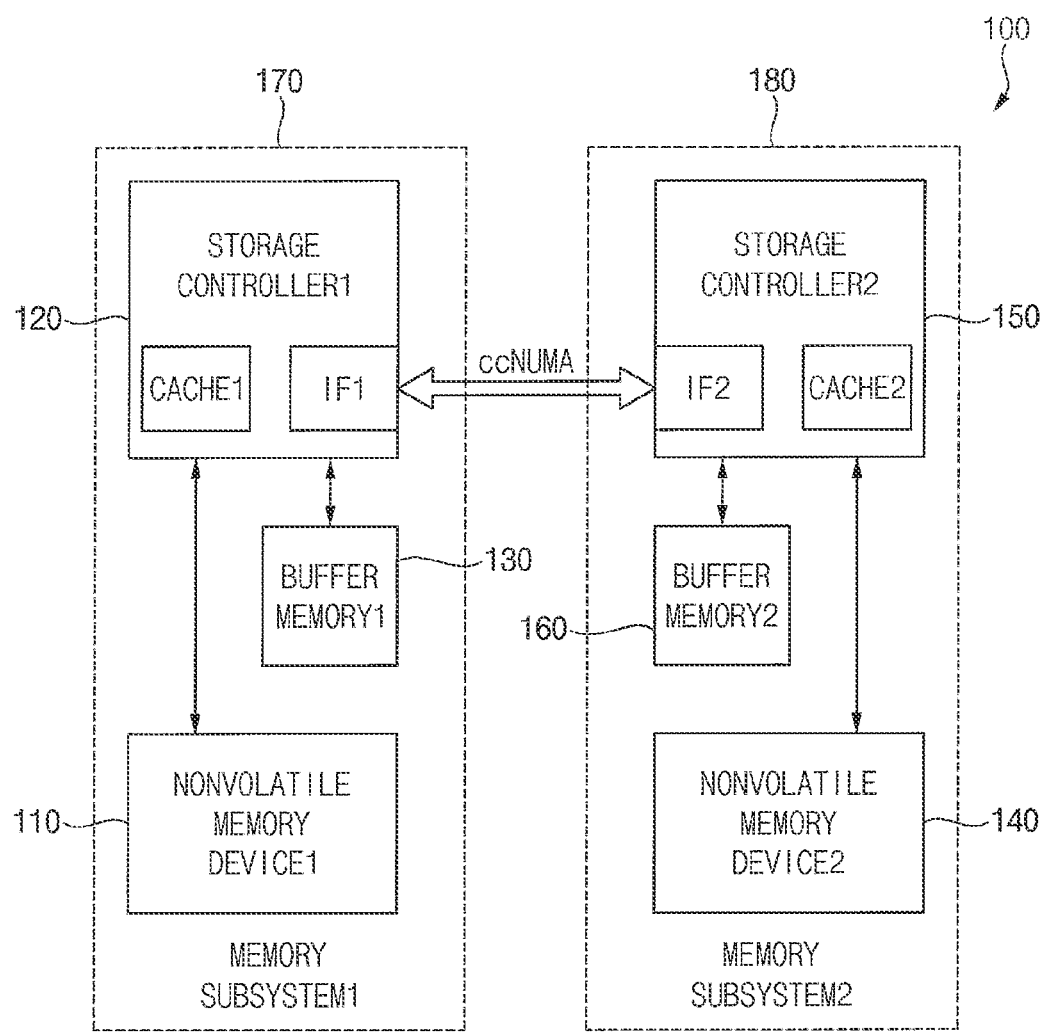
FIG. 1 is a block diagram illustrating a storage device according to embodiments of the inventive concepts.

FIG. 1 is a block diagram illustrating in one example (100) a storage device according to embodiments of the inventive concept.

Referring to FIG. 1, the storage device 100 generally includes a first memory subsystem 170 and a second memory subsystem 180, wherein one or more resources may be shared between the first and second memory subsystems 170 and 180. Here, the first memory subsystem 170 may include a first NVM 110, a first storage controller 120, and the second memory subsystem 180 may include a second NVM 140 and a second storage controller 150.

In some embodiments, the storage device 100 may be implemented as a solid state drive (SSD) device. For example, the storage device 100 may be implemented as a SSD configured to operate in accordance with one or more conventionally-understood and commercially available technical standards, such as those promulgated in relation to the nonvolatile memory express (NVMe), universal flash storage (UFS), multi-media card (MMC) storage, embedded MMC (eMMC) storage, etc. Alternately, the storage device 100 may be implemented as a secure digital (SD) card, a micro SD card, a memory stick, a chip card, a universal serial bus (USB) card, a smart card, a compact flash (CF) card, etc.

The first NVM 110 may be controlled by the first storage controller 120 to store write data received from a host, whereas the second NVM 140 may be controlled by the second storage controller 150 to store write data received from first host (e.g., the same first host communicating with the first storage controller 120 or a second host different from the first host). Further, first read data retrieved from the first NVM 110 by the first storage controller 120 to be provided to the first host, and second read data retrieved from the second NVM 140 by the second storage controller 150 to be provided to the first host or the second host. Thus, the first storage controller 120 may be configured to control data access operations performed by the first NVM 110, and the second storage controller 150 may be configured to control data access operations performed by the second NVM 140.

In some embodiments, one or both of the first NVM 110 and the second NVM 140 may be implemented as an NAND flash memory. Alternately, one or both of the first NVM 110 and the second NVM 140 may be implemented as an electrically erasable programmable read-only memory (EEPROM), a phase change random access memory (PRAM), a resistive random access memory (RRAM), a nano floating gate memory (NFGM), a polymer random access memory (PoRAM), a magnetic random access memory (MRAM), a ferroelectric random access memory (FRAM), etc.

In the illustrated example of FIG. 1, the storage device 100 is assumed to include two storage controllers (e.g., the first storage controller 120 and the second storage controller 150). However, those skilled in the art will recognize from the foregoing that a single storage device within the context of the inventive concept may include N storage controllers, wherein 'N' is an integer greater than 1. In this regard, many conventional storage devices include one storage controller that has been individually designed (or customized in design) in accordance with certain performance criteria. Further in this regard, the in-advance (or pre-set) customization of design for the single storage controller offers certain benefits, but it also offers no real performance flexibility across a range of storage devices having different performance criteria or across a range of different performance profiles. Plainly stated, the conventional approach to storage controller design lacks any real ability to actively scale storage controller performance (i.e., it lacks scalability).

In contrast, storage device according to embodiments of the inventive concept include two or more storage controllers providing real scalability. For example, a number of storage controllers to-be-included in the storage device may be selected in relation to desired performance criteria for the storage device. Accordingly, the scalability of storage controllers within a storage device according to embodiments of the inventive concept, provides improved scalability of the storage device. As a result, a storage device according to embodiments of the inventive concept may be used across a range of systems, wherein each system has different performance criteria. And as a further result, fewer storage devices of fixed-performance will be required, thereby reducing design and development costs.

Each of the first and second memory subsystems 170 and 180 within the storage device 100 may include, functionally provide, and/or be associated with one or more resources. For example, the first memory subsystem 170 may include a first resource, and the second memory subsystem may include a second resource. Here, the term "resource" is used to denote a broad range of hardware resources like processors, memories, registers, communication channels, as well as software resources like programming code, stored data, etc. Of note in his regard and as mentioned above, some embodiments of the inventive concept may be configured to share one or more resources within the storage device 100 (e.g., between the first and second memory subsystems 170 and 180). For example, a second resource associated with the second memory subsystem 180 may be usable by the first storage controller 120 of the first memory subsystem 170, and/or a first resource associated with the first memory subsystem 170 may be usable by the second storage controller 150 of the second memory subsystem 180. Here, the term "usable" denotes at least one ability by a control element, such as a processor or controller, to functionally operate or interoperate with a resource. Thus, if the resource in question is a memory or a register, a processor or controller may be configured to perform a data access operation in relation to the memory or register. If the resource is a stored data structure (e.g., a list, a table, a vector, etc.), a controller or a processor may be configured to change (or update) the stored data structure.

As illustrated in FIG. 1, the first storage controller 120 of the first memory subsystem 170 may include, as a first resource, a first cache memory (CACHE1), and the second storage controller 150 of the second memory subsystem 180 may include, as a second resource, a second cache memory (CACHE2), wherein the respective first and second cache memories may be shared among the first and second memory subsystems 170 and 180. That is, the first storage controller 120 may access the first cache memory and the second cache memory, and the second storage controller 150 may access the second cache memory and the first cache memory. Here, the term "access" denotes execution of a data access operation (e.g., a read operation, a write operation, an erase operation, an update operation, a house-keeping operation, etc.).

As further illustrated in FIG. 1, the first memory subsystem 170 may include, as a first resource, a first buffer memory 130, and the second memory subsystem 180 may include, as a second resource, a second buffer memory 160, wherein the respective first and second buffer memories 130 and 160 may be shared among the first and second memory subsystems 170 and 180. That is, the first storage controller 120 may access the first buffer memory 130 and/or the second buffer memory 160, and the second storage controller 150 may access the second buffer memory 160 and/or the first buffer memory 130.

In this regard, each of the first and second buffer memories 130 and 160 may be implemented as a volatile memory device, such as a dynamic random access memory (DRAM) or a static random access memory (SRAM).

In some embodiments, the first buffer memory 130 (or the second buffer memory 160) and the first storage controller 120 (or the second storage controller 150) may be respectively implemented using separate semiconductor chips. Alternately, the first buffer memory 130 (or the second buffer memory 160) may be commonly integrated with the first storage controller 120 (or the second storage controller 150).

In some embodiments, the first and second memory subsystems 170 and 180 may share the first and second NVMs 110 and 140. That is, the first storage controller 120 may access at least a portion (e.g., a defined region) of the first NVM 110 and at least a portion of the second NVM 140. For example, the first storage controller 120 may access, as namespace region(s), some portion(s) of the first and second NVMs 110 and 140, e.g., in response to a namespace generation request received from a host. In this regard, in some embodiments, the first storage controller 120 may access only a portion of the second NVM 140 as the namespace region in response to the namespace generation request received from the host (e.g., in a case where the entire region of the first NVM 110 is already set as other namespace regions).

From the foregoing, those skilled in the art will appreciate that any reasonable number of cache memories, buffer memories, NVMs, designated NVM portions, instruction or data queues, registers, and/or computational resources may be variously shared among a plurality of memory subsystems operating within a storage device according to embodiments of the inventive concept.

In order to more efficiently share one or more resources, in some embodiments the first and second storage controllers 120 and 150 of the first and second memory subsystems 170 and 180, may include one or more interface unit(s) (IF). For example, the first storage controller 120 may include a first interface unit IF1, and the second storage controller 150 may include a second interface unit IF2. In this regard, each of the first and second interface units IF1 and IF2 may be implemented as a cache-coherent, non-uniform memory access (ccNUMA) unit that enables communication directly between the first and second interface units IF1 and IF2 through a ccNUMA channel. That is, each of the first and second interface units IF1 and IF2 may be configured to operate as a cache coherent interconnect for accelerators (CCIX) unit, a compute express link (CXL) unit, and/or a ccNUMA unit. Hence, the first storage controller 120 may access at least one of the second resources (e.g., the second cache memory CACHE2, the second buffer memory 160 and the second NVM 140) of the second memory subsystem 180 via the first interface unit IF1 and the second interface unit IF2, and the second storage controller 150 may access at least one of the first resources (e.g., the first cache memory CACHE1, the first buffer memory 130 and the first NVM 110) of the first memory subsystem 170 via the second interface unit IF2 and the first interface unit IF1.

The storage device 100 of FIG. 1 is one example in which a plurality (e.g., first and second) of storage controllers cooperatively operate within a single storage device. However, as noted above, three or more storage controllers may be included and operated within a single storage device depending on various performance criteria, such as operating speed, data bandwidth, partitioning of data, environmental operating conditions, etc. Once an appropriate number of memory subsystems and/or storage controllers has been selected during design of the storage device, various shared resources may be designated for the different memory subsystems. Accordingly, scalability of storage devices according to embodiments of the inventive concept may be improved, and storage devices according to embodiments of the inventive concept may be used within the various systems characterized by different performance criteria.

Figure 2:
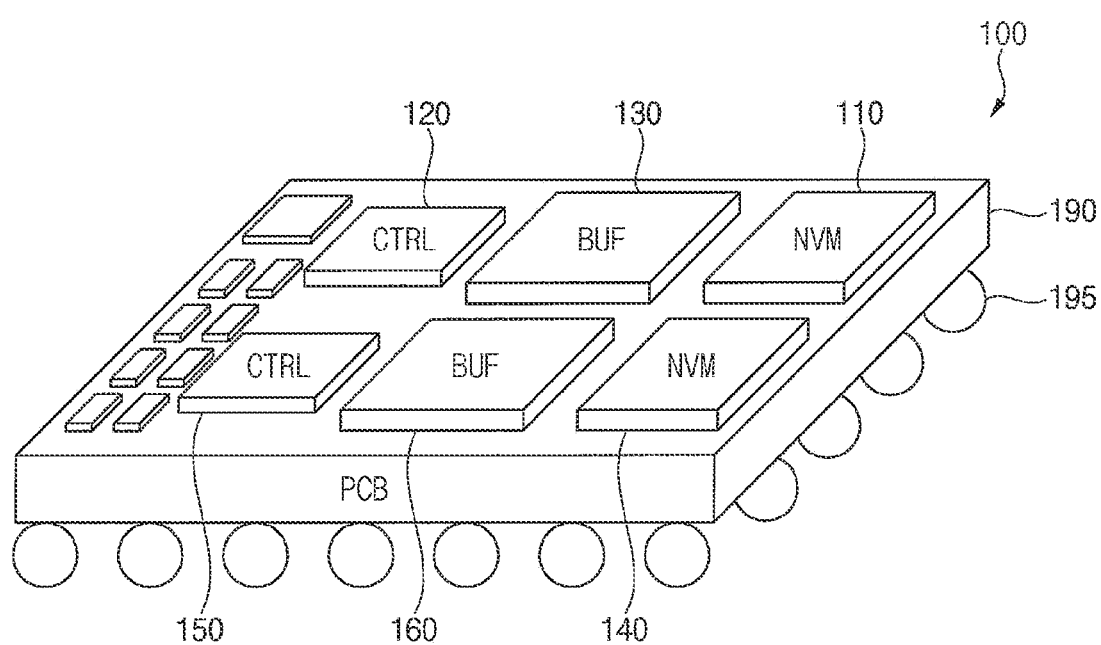
FIG. 2 is a perspective diagram further illustrating in one example the storage device of FIG. 1.

FIG. 2 is a perspective diagram further illustrating in one example the storage device 100 of FIG. 1.

Referring to FIGS. 1 and 2, the storage device 100 may include the first NVM 110, the first storage controller 120, the first buffer memory 130, the second NVM 140, the second storage controller 150, and the second buffer memory 160, which are collectively mounted on a substrate (e.g., a printed circuit board (PCB) 190 attached, for example, to a ball grid array 195.

Here, each of the first and second storage controllers 120 and 150 may be implemented as a controller chip CTRL; each of the first and second buffer memories 130 and 160 may be implemented as a buffer memory chip BUF; and, each of the first and second NVMs 110 and 140 may be implemented as a NVM. The controller chips CTRL implementing the first and second storage controllers 120 and 150, the memory chips BUF implementing the first and second buffer memories 130 and 160, and memory chips NVM implementing the first and second NVMs 110 and 140 may be variously mounted (e.g., electrically connected and/or mechanically attached) on an upper surface of the PCB 190. In contrast, the ball grid array 195 may be disposed on an opposing lower surface of the PCB 190. In some embodiments, the first and second storage controllers 120 and 150 may communicate with a host through connecting wiring extending through the PCB 190 and connected to the ball grid array 195.

Figure 3:
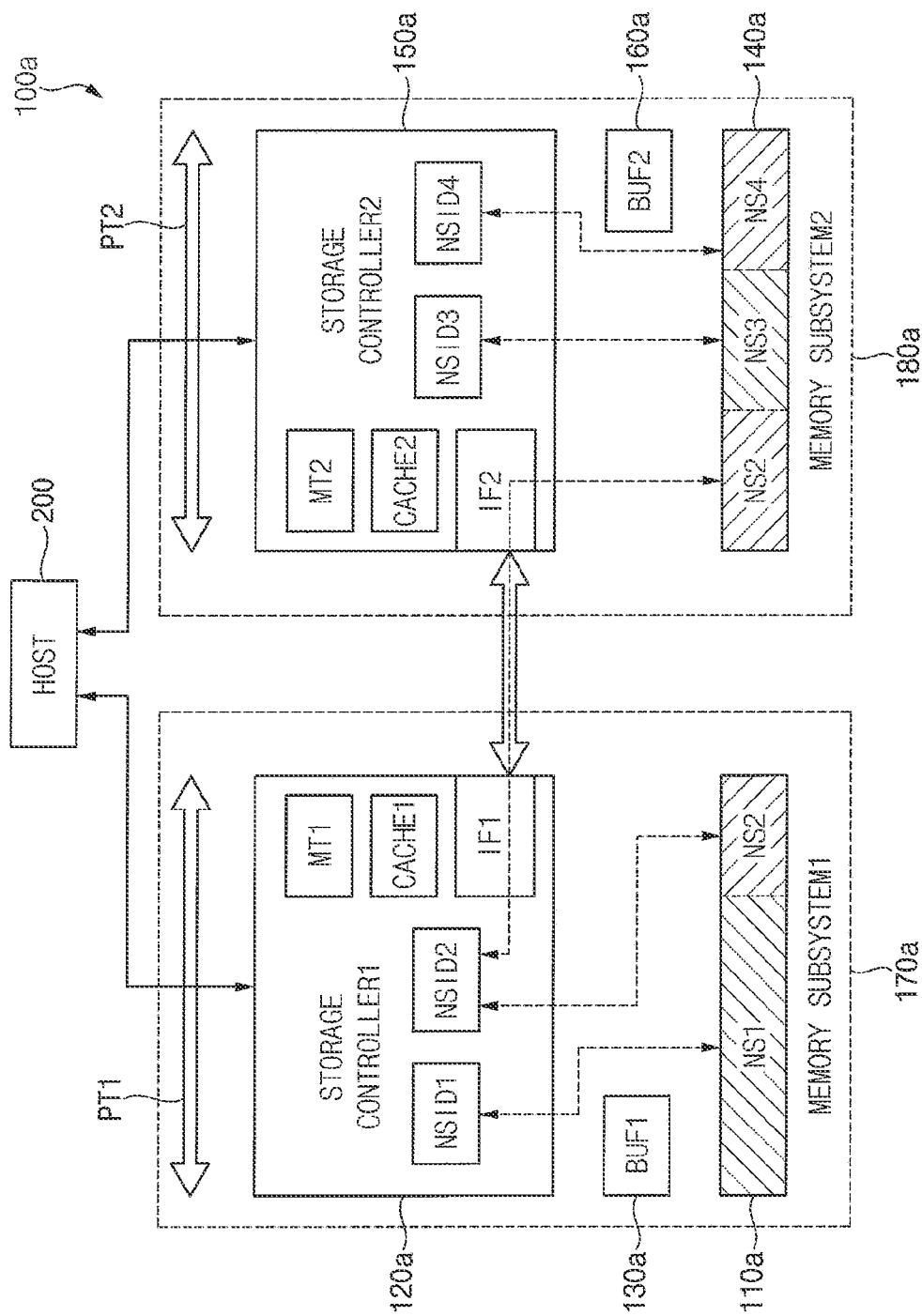
FIG. 3 is a block diagram illustrating a storage device connected to a host in a system according to embodiments of the inventive concept.

FIG. 3 is a block diagram illustrating in another example (100a) the storage device 100 of FIG. 1, as connected with a host 200 in a system according to embodiments of the inventive concept.

Referring to FIG. 3, the storage device 100a may include a first port PT1, a first NVM 110a, a first storage controller 120a, a first buffer memory BUF1 or 130a, a second port PT2, a second NVM 140a, a second storage controller 150a and a second buffer memory BUF2 or 160a. The first port PT1, the first NVM 110a, the first storage controller 120a and the first buffer memory 130a may be understood as collectively forming a first memory subsystem 170a, whereas the second port PT2, the second NVM 140a, the second storage controller 150a and the second buffer memory 160a may be understood as collectively forming a second memory subsystem 180a.

The first storage controller 120a may communicate (e.g., send and/or receive data and/or various command/control/ address signals) with the host 200 through the first port PT1, and the second storage controller 150a may communicate with the host 200 through the second port PT2. In some embodiments, the first port PT1 and the second port PT2 may be implemented in relation to the ball grid array 195 of FIG. 2. The first storage controller 120a may include a first mapping table MT1 used to convert logical address(es) received from the host 200 to corresponding physical address(es) associated with the first NVM 110a. The first storage controller may also include the first cache memory CACHE1 variously configured to store data required for operation of the first storage controller 120a, and the first interface unit IF1 enabling communication with the second memory subsystem 180a. In similar manner, the second storage controller 150a may include a second mapping table MT2, the second cache memory CACHE2, and the second interface unit IF2.

Referring to FIG. 3, the host 200 may request generation of first and second namespaces NS1 and NS2 by the first storage controller 120a in relation to the first NVM 110a. The host 200 may also request generation of third and fourth namespaces NS3 and NS4 by the second storage controller 120a in relation to the second storage controller 150a.

In response to the generation request for the first namespace NS1, the first storage controller 120a may set (or designate) a first region of the first NVM 110a as the first namespace NS1, and may provide a first namespace identifier NSID1 for the first namespace NS1 to the host 200. Thereafter, the host 200 may request a data access operation directed to data stored (or to-be-stored) in the first namespace NS1 using the first namespace identifier NSID1. Further, in response to the generation requests for the third and fourth namespaces NS3 and NS4, the second storage controller 150a may set third and fourth regions of the second NVM 140a as third and fourth namespace NS3 and NS4, and provide third and fourth namespace identifiers NSID3 and NSID4 in relation to the fourth namespace NS3 and NS4 to the host 200. Thereafter, the host 200 may request a data access operation directed to data stored (or to-be-stored) in the third and fourth namespace NS3 and NS4 using the third and fourth namespace identifiers NSID3 and NSID4.

Still further, in response to a generation request associated with a second namespace NS2, the first storage controller 120a may set a portion of the first NVM 110a and a portion of the second NVM 140a as respective second namespaces NS2 and provide a second namespace identifier NSID2 associated with the second namespace NS2 to the host 200. (This example assumes, for example, that (1) at least the second NM 140a is a shared second resource; and (2) available free space within the first NVM 110a is less than a total space requested by the host 200 in relation to the second namespace NS2). Accordingly, the host 200 may request a data access operation directed to data stored (or to-be-stored) in the second namespace NS2 using the second namespace identifier NSID2, recognizing that the second namespace NS2 has been physically implemented across both the first NVM 110a and the second NVM 140a) Nonetheless, an entire logical address range associated with the second namespace NS2 may be assigned to a portion of the first NVM 110a. Thus, in a case where a data access request indicating memory cells associated with the second namespace identifier NSID2 is directed to the first storage controller 120a, the resulting data access operation may be performed in relation to the first NVM 110a. Alternately, in a case where a data access request indicates memory cells associated with the second namespace identifier NSID2 is directed to the second storage controller 150a, the resulting data access operation may be performed in relation to the second NVM 140a.

For example, in a case where the first storage controller 120a receives a write request having a logical address within the logical address region assigned to the first NVM 110a along with the second namespace identifier NSID2 from the host 200, the first storage controller 120a may perform a data write operation for the first NVM 110a. Alternately, in a case where the first storage controller 120a receives a write request having a logical address within the logical address region assigned to the second NVM 140a along with the second namespace identifier NSID2 from the host 200, the first storage controller 120a may store write data received from the host 200 in the first buffer memory 130a, and the second storage controller 150a may perform a data write operation that writes the write data stored in the first buffer memory 130a (e.g., without using the second buffer memory 160a) to the second NVM 140a.

Further, in a case where the first storage controller 120a receives a read request having a logical address within the logical address region assigned to the first NVM 110a along with the second namespace identifier NSID2 from the host 200, the first storage controller 120a may perform a data read operation for the first NVM 110a. Alternately, in a case where the first storage controller 120a receives a read request having a logical address within the logical address region assigned to the second NVM 140a along with the second namespace identifier NSID2 from the host 200, the second storage controller 150a may store read data in the second buffer memory 160a by performing a data read operation for the second NVM 140a, and the first storage controller 120a may provide the read data stored in the second buffer memory 160a (e.g., without using the first buffer memory 130a) to the host 200 through the first port PT1.

Accordingly, during the performing of various data access operations in response to various requests from the host 200 indicating the second namespace NS2, the first memory subsystem 170a (or the first storage controller 120a) may use a portion of the first NVM 110a associated with the first memory subsystem and/or a portion of the second NVM 140a associated with the second memory subsystem 180a.

FIG. 4 is a flowchart illustrating a method of writing data in a storage device according to embodiments of the inventive concept, FIG. 5A is a set of tables including a first mapping table and a second mapping table before a data write operation has been performed, and FIG. 5B is a set of tables including the first mapping table and the second mapping table after the data write operation has been performed.

The method of FIG. 4 may be performed in some embodiments using the storage device of FIG. 3. For example, a method of operating a storage device according to embodiments of the inventive concept may be used to write data under assumed conditions that the first memory subsystem 170a receives from the host 200 a write request indicating memory cells of the second NVM 140a which is associated with the second memory subsystem 180a.

Thus, referring to FIGS. 3 and 4, the first storage controller 120a of the first memory subsystem 170a receives a write request from the host 200 indicating memory cells in the second NVM 140a associated with the second memory subsystem 180a (S300). For example, the first storage controller 120a may receive from the host 200 the write request including: (1) a write command; (2) the second namespace identifier NSID2 associated with the second namespace NS2 assigned across both first and second NVMs 110a and 140a; (3) a logical address indicating memory cells assigned to the second NVM 140a; and (4) write data.

In response to the foregoing, the first storage controller 120a may transfer write request information related to the write request to the second storage controller 150a (S310). For example, the first storage controller 120a may transfer the write request information including the second namespace identifier NSID2, the logical address and a size of the write data to the second storage controller 150a through a first interface unit IF1. And the second storage controller 150a may receive the write request information through a second interface unit IF2, and may request storage state information for the write data to the first storage controller 120a.

The first storage controller 120a may store the write data received from the host 200 in the first buffer memory 130a (S320), and store the storage state information for the write data in the first cache memory CACHE1 (S330). Here, the storage state information may indicate whether the write data are stored in the first buffer memory 130a. In some embodiments, the storage state information may be provided as a bitmap in which each bit of the bitmap indicates whether or not a corresponding unit of write data is stored.

In this regard, the second storage controller 150a may check the storage state information for the write data in the first cache memory CACHE1 using the second interface unit IF2 (S340). In a case where the storage state information in the first cache memory CACHE1 indicates that at least a portion of the write data is not stored in the first buffer memory 130a (S350=NO), the second storage controller 150a may wait for the write data to be stored in the first buffer memory 130a the first storage controller 120a.

However, in a case where the storage state information in the first cache memory CACHE1 indicates that storing the write data in the first buffer memory 130a is complete (S350=YES), the second storage controller 150a may perform a data write operation that writes the write data from the first buffer memory 130a to the second NVM 140a (S360). In some embodiments, the second storage controller 150a may read the write data from the first buffer memory 130a using the second interface unit IF2, and may write the write data read from the first buffer memory 130a to the second NVM 140a, without using the second buffer memory 160a.

Once the write data are written to the second NVM 140a, the second storage controller 150a may update a second mapping table MT2 (S370), and may transfer write completion information to the first storage controller 120a using the second interface unit IF2 (S380). For example, the write completion information may include the second namespace identifier NSID2 and the logical address of the write request. Further, the first storage controller 120a may update a first mapping table MT1 in response to the write completion information (S390).

Referring to FIGS. 5A and 5B, each mapping table MT1a, MT2a, MT1b and MT2b may store a physical address corresponding to a logical address, wherein the physical address may include a NVM identifier (NVM_ID) and a NVM address (NVM_ADDR). Here, a logical address region including first through N-th logical addresses LA1 through LAN may be assigned to the first NVM 110a, and a logical address region including (N+1)-th through M-th logical addresses LAN+1 through LAM may be assigned to the second NVM 140a, where 'N' is an integer greater than 0, and 'M' is an integer greater than N. Further, before the write request is receive, or before the data write operation is performed, the first storage controller 120a may store write data in a region of the first NVM 110a having first through N-th addresses ADDR1 through ADDRN in response to previous write requests having the first through N-th logical addresses LA1 through LAN. In this case and as illustrated in FIG. 5A, before the data write operation is performed, the first mapping table MT1a may store a first NVM identifier NVM1 indicating the first NVM 110a and the first through N-th addresses ADDR1 through ADDRN of the first NVM 110a with respect to the first through N-th logical addresses LA1 through LAN, and the second mapping table MT2a may store the first NVM identifier NVM1 indicating the first NVM 110a with respect to the first through N-th logical addresses LA1 through LAN. Thereafter, the first storage controller 120a may receive the write requests having the (N+1)-th through M-th logical addresses LAN+1 through LAM, and the second storage controller 150a may perform the data write operations that store the write data in a region of the second NVM 140a having (N+1)-th through M-th addresses ADDRN+1 through ADDRM. In this case and as illustrated in FIG. 5B, the second storage controller 150a may update the second mapping table MT2b such that the second mapping table MT2 may store, as physical addresses corresponding to the (N+1)-th through M-th logical addresses LAN+1 through LAM included in the write requests, a second NVM identifier NVM2 indicating the second NVM 140a, and the (N+1)-th through M-th addresses ADDRN+1 through ADDRM of the region of the second NVM 140a in which the write data are stored. Further, the first storage controller 120a may update the first mapping table MT1b such that the first mapping table MT1b may store, as physical addresses corresponding to the (N+1)-th through M-th logical addresses LAN+1 through LAM included in the write requests, the second NVM identifier NVM2 indicating the second NVM 140a.

The first storage controller 120a may transfer a write completion response to the host 200 through a first port PT1 in response to the write completion information from the second storage controller 150a (S395).

Figure 6:
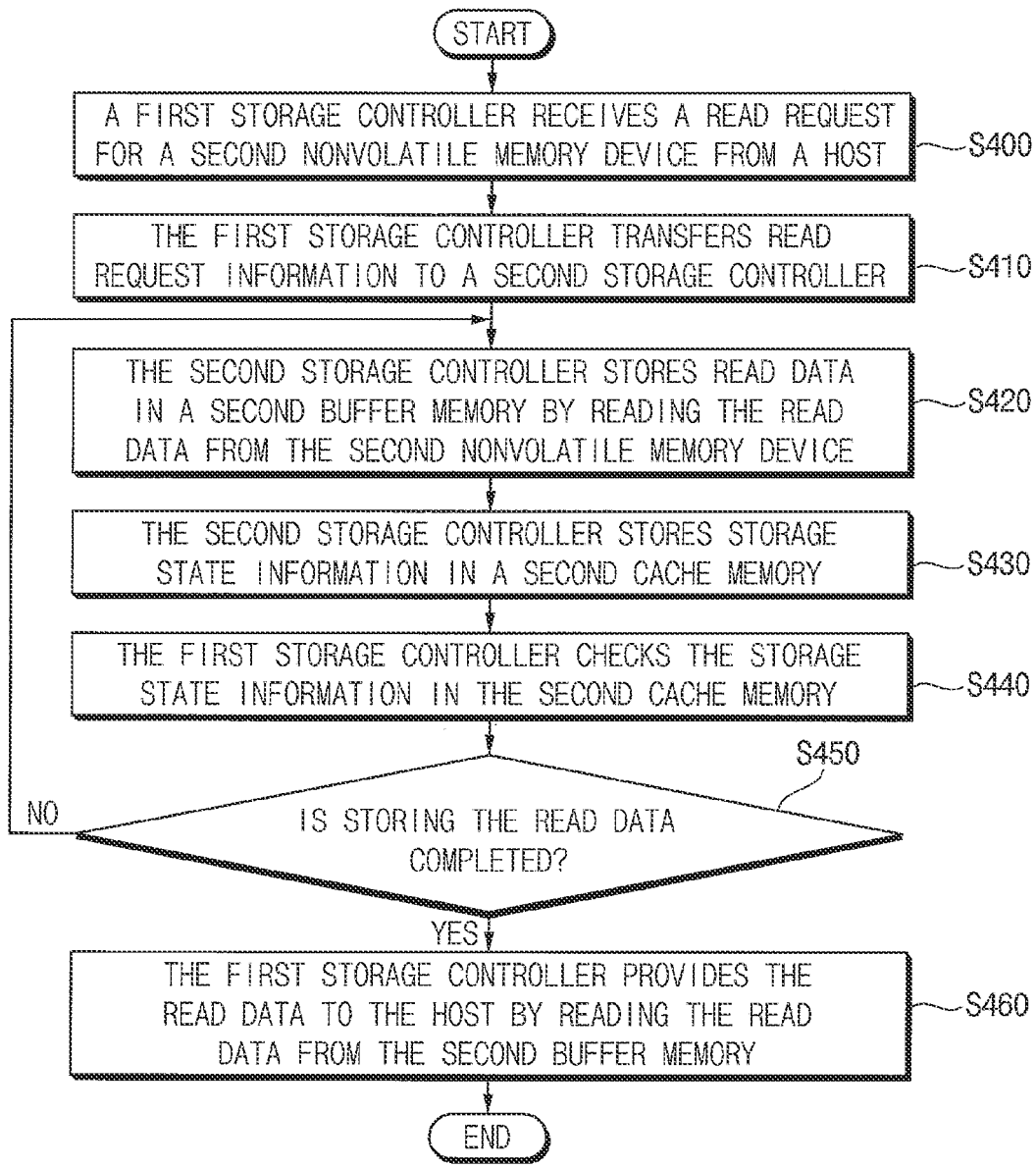
FIG. 6 is a flowchart illustrating a method of reading data in a storage device according to embodiments of the inventive concepts.

FIG. 6 is a flowchart illustrating a method of reading data in a storage device according to embodiments of the inventive concept.

The method of FIG. 6 may be performed in some embodiments using the storage device of FIG. 3. That is, a method of operating a storage device according to embodiments of the inventive concept may be used to read data under assumed conditions that the first memory subsystem 170a receives from the host 200 a read request indicating memory cells of the second NVM 140a which is associated with the second memory subsystem 180a.

Referring to FIGS. 3 and 6, the first storage controller 120a of the first memory subsystem 170a receives a read request from the host 200 directed to memory cells of the second NVM 140a in the second memory subsystem 180a (S400). For example, the first storage controller 120a may receive from the host 200 the read request including: (1) a read command, (2) the second namespace identifier NSID2 for the second namespace NS2 assigned to first and second NVMs 110a and 140a, (3) a logical address within a logical address region assigned to the second NVM 140a, and (4) a size of read data.

In response, the first storage controller 120a may transfer read request information associated with the read request to the second storage controller 150a (S410). For example, the first storage controller 120a may transfer the read request information including the second namespace identifier NSID2, the logical address and the size of the read data to the second storage controller 150a through a first interface unit IF1. Further, first storage controller 120a may request storage state information for the read data to the second storage controller 150a.

The second storage controller 150a may store the read data in a second buffer memory 160a by performing a read operation that retrieves the read data from the second NVM 140a in response to the read request information and a second mapping table MT2 (S420). For example, the second storage controller 150a may search for a physical address corresponding to the logical address of the read request information in the second mapping table MT2, and may retrieve the read data from a region of the second NVM 140a indicated by the physical address.

Further, the second storage controller 150a may store storage state information for the read data in a second cache memory CACHE2 (S430). Here, the storage state information may indicate whether the read data are stored in the second buffer memory 160a. For example, the storage state information may be provided as a bitmap in which each bit indicates whether or not a corresponding unit of the read data is stored.

The first storage controller 120a may check the storage state information for the read data in the second cache memory CACHE2 using the first interface unit IF1 (S440). In a case where the storage state information in the second cache memory CACHE2 indicates that at least a portion of the read data is not stored in the second buffer memory 160a (S450=NO), the first storage controller 120a may wait for the read data to be stored in the second buffer memory 160a by the second storage controller 150a.

However, in a case where the storage state information in the second cache memory CACHE2 indicates that storing the read data in the second buffer memory 160a is completed (S450=YES), the first storage controller 120a may provide the read data to the host 200 by reading the read data from the second buffer memory 160a, without using a first buffer memory 130a (S460).

Figure 7:
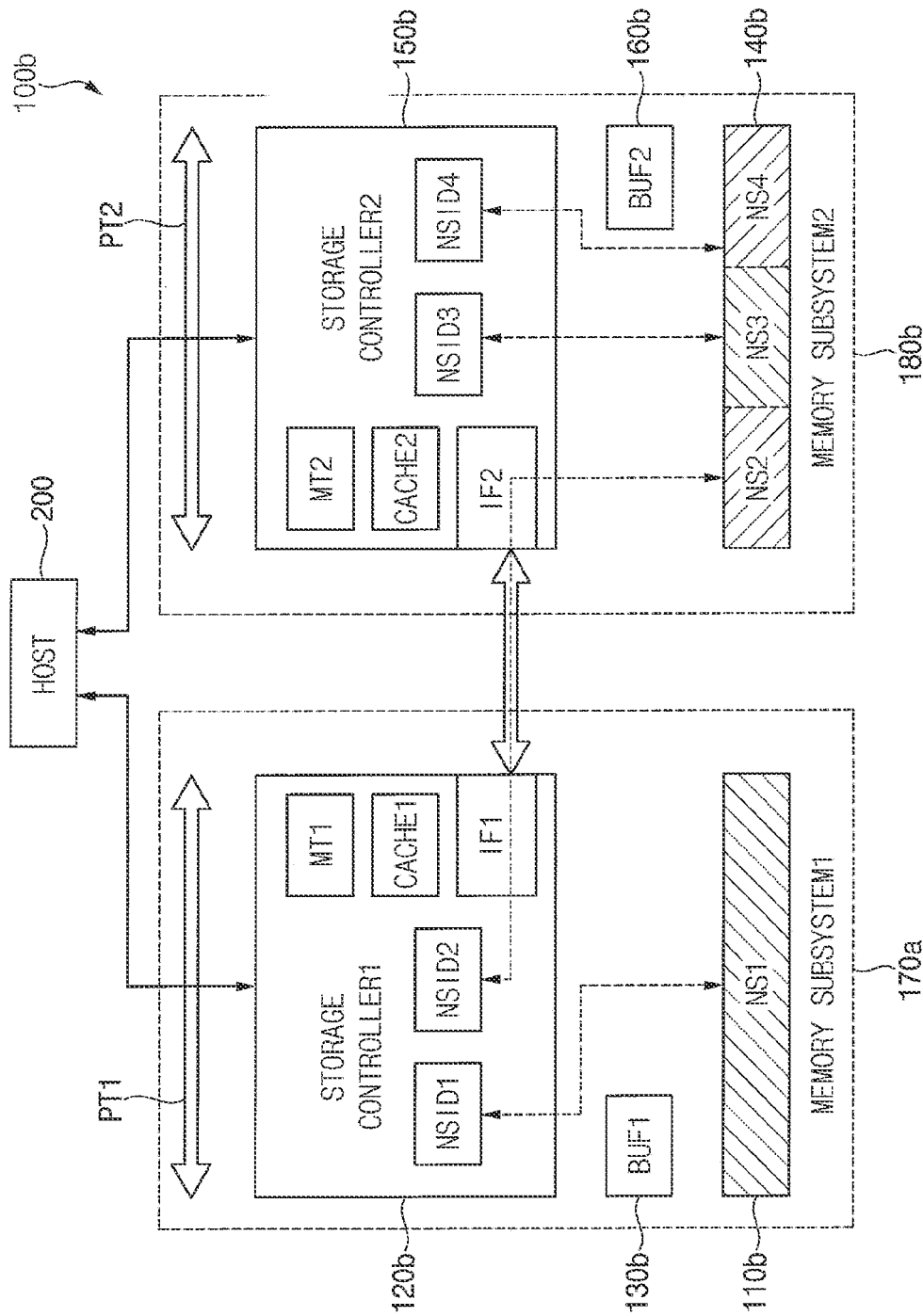

FIG. 7 is a block diagram illustrating in still another example (100b) the storage device 100 of FIG. 1, as connected with the host 200 in a system according to embodiments of the inventive concept.

Referring to FIG. 7, a storage device 100b may include a first port PT1, a first NVM 110b, a first storage controller 120b, a first buffer memory 130b, a second port PT2, a second NVM 140b, a second storage controller 150b and a second buffer memory 160b. The first port PT1, the first NVM 110b, the first storage controller 120b and the first buffer memory 130b may form a first memory subsystem 170b, and the second port PT2, the second NVM 140b, the second storage controller 150b and the second buffer memory 160b may substantially constitute a second memory subsystem 180b. The storage device 100b of FIG. 7 may have substantially the same configuration and perform substantially the same operations as a storage device 100a of FIG. 3, except that the first storage controller 120b of the first memory subsystem 170b may set only at least a portion of a region of the second NVM 140b of the second memory subsystem 180b as a region of a second namespace NS2.

Thus, in response to a generation request of the second namespace NS2, the first storage controller 120b may set only at least a portion of the region of the second NVM 140b as the region of the second namespace NS2 (e.g., in a case where all region of the first NVM 110b is set as a region of a first namespace NS1, or in a case where the first NVM 110b has no free space). The first storage controller 120b may also provide a second namespace identifier NSID2 for the second namespace NS2 to the host 200. Thereafter, the host 200 may request a data access operation for the second namespace NS2 using the second namespace identifier NSID2. Thus, in a case where the first storage controller 120b receives a write/read request having the second namespace identifier NSID2 from the host 200, a data write/read operation for the second NVM 140b may be performed.

FIG. 8 is a block diagram illustrating in still another example (100c) the storage device 100 of FIG. 1, as connected with a first host 210 and a second host 220 in a system according to embodiments of the inventive concept.

Referring to FIG. 8, a storage device 100c may include a first port PT1, a first NVM 110c, a first storage controller 120c, a first buffer memory 130c, a second port PT2, a second NVM 140c, a second storage controller 150c and a second buffer memory 160c. The first port PT1, the first NVM 110c, the first storage controller 120c and the first buffer memory 130c may form a first memory subsystem 170c, and the second port PT2, the second NVM 140c, the second storage controller 150c and the second buffer memory 160c may substantially constitute a second memory subsystem 180c. The storage device 100c of FIG. 8 may have substantially the same configuration and perform substantially the same operations as a storage device 100a of FIG. 3, except that the first storage controller 120c may directly communicate with the first host 210, and the second storage controller 150c may directly communicate with the second host 220.

For example, the first storage controller 120c may communicate with the first host 210 through the first port PT1, and the second storage controller 150c may communicate with the second host 220 through the second port PT2. In the illustrated example of FIG. 8, in response to a generation request of a second namespace NS2 from the first host 210, the first storage controller 120c may set at least a portion of a region of the first NVM 110c and at least a portion of a region of the second NVM 140c as a region of the second namespace NS2. Thus, in a case where the first storage controller 120c receives a write/read request having a second namespace identifier NSID2 from the first host 210, both a first data write/read operation directed to the first NVM 110c, and a second data write/read operation directed to the second NVM 140c may be performed.

Figure 9:
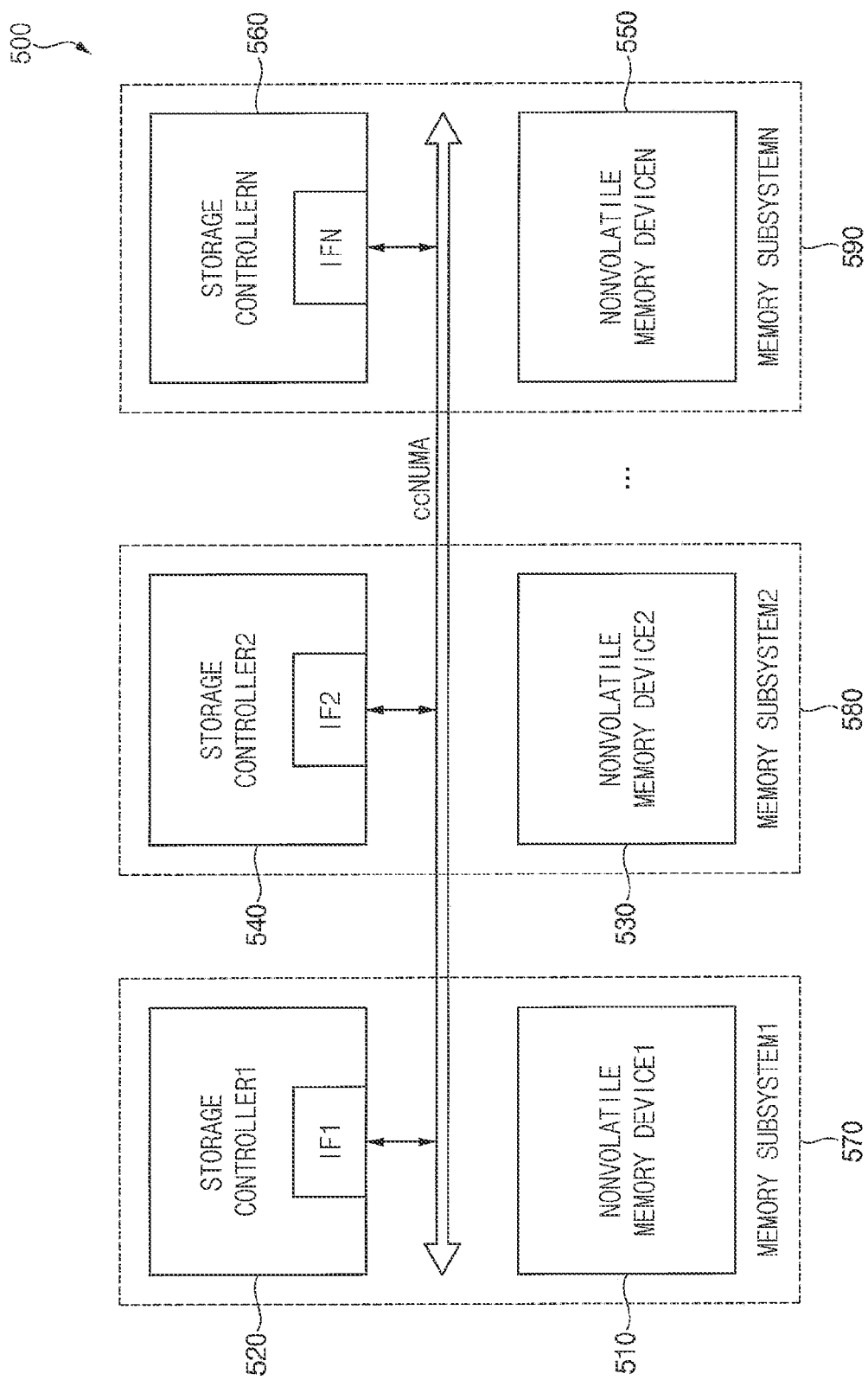
FIG. 9 is a block diagram illustrating a storage device according to embodiments of the inventive concepts.

FIG. 9 is a block diagram illustrating a storage device 500 according to embodiments of the inventive concept.

Referring to FIG. 9, the storage device 500 may include first through N-th NVMs 510, 530 and 550, as well as first through N-th storage controllers 520, 540 and 560, wherein 'N' is an integer greater than 1. Here, the first through N-th NVMs 510, 530 . . . and 550 and the first through N-th storage controllers 520, 540 . . . and 560 may respectively be combined in their operation to form first through N-th memory subsystems 570, 580 . . . and 590. If follows that, the storage device 500 include any reasonable number of storage controllers 520, 540 . . . and 560 in accordance with established performance criteria.

Further, in the storage device 500 may variously include one or more shared resources (e.g., cache memories, buffer memories, NVMs, etc.) within one or more of the first through N-th memory subsystems 570, 580 and 590. For example, the first through N-th storage controllers 520, 540 and 560 may include first through N-th interface units IF1, IF2 and IFN, respectively. A storage controller (e.g., the first storage controller 520) of each memory subsystem (e.g., the first memory subsystem 570) may be configured to use or access the various shared resources across the other memory subsystems (e.g., the second through N-th memory subsystems 580 and 590) through a corresponding interface unit (e.g., the first interface unit IF1).

Figure 10:
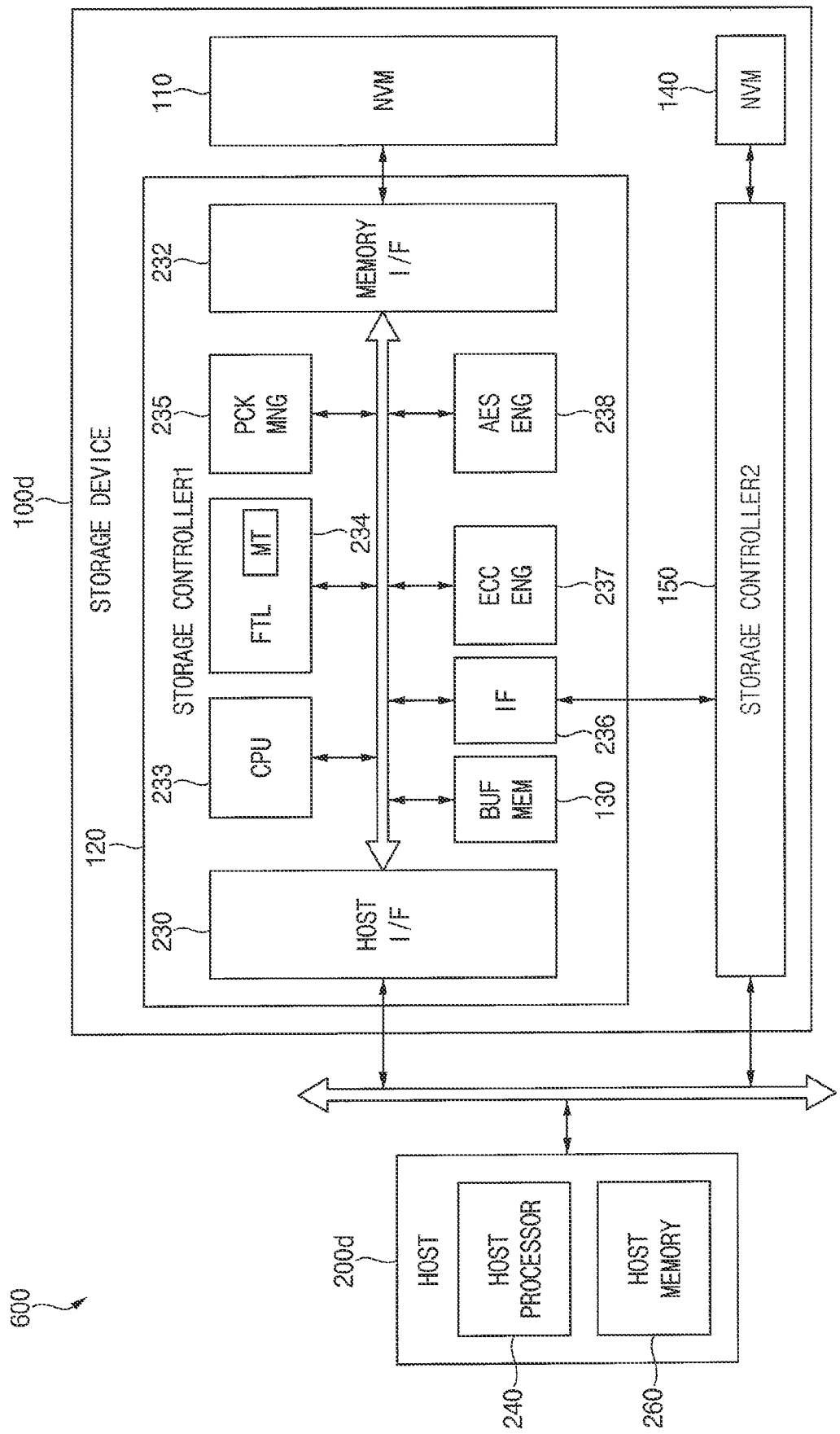
FIG. 10 is a block diagram illustrating a computational system according to embodiments of the inventive concepts.

FIG. 10 is a block diagram illustrating a computational system 600 according to embodiments of the inventive concept, wherein the computational system 600 generally includes a storage device 100*d* connected with a host 200*d*.

Referring to FIG. 10, the host 200*d* may include a host processor 240 and a host memory 260. The storage device 100*d* may include a plurality of storage controllers 120 and 150 and a plurality of NVMs (hereinafter, "NVMs") 110 and 140. In some embodiments, each NVM 110 and 140 may be implemented as a flash memory (e.g., a two-dimensional (2D) NAND memory array or a 3D (or vertical) NAND (VNAND) memory array). However, in other embodiments, each NVM 110 and 140 may variously include other types of nonvolatile memory cells, such as, MRAM, spin-transfer torque MRAM, conductive bridging RAM (CBRAM), FRAM, PRAM, RRAM, etc.

Each storage controller 120 and 150 may include a host interface 230, a memory interface 232, a central processing unit (CPU) 233, a buffer memory 130 and an interface unit IF or 236. Each storage controller 120 and 150 may further include a flash translation layer (FTL) 234, a packet manager 235, an error correction code (ECC) engine 237 and an advanced encryption standard (AES) engine 238. Each storage controller 120 and 150 may further include a working memory (not shown) in which the FTL 234 is loaded, and the CPU 233 may execute the FTL 234 to control data write and read operations on each NVM 110 and 140.

The host interface 230 may communicate (e.g., transmit and/or receive) packets to/from the host 200*d*. A packet transmitted from the host 200*d* to the host interface 230 may include a command or data to be written to each NVM 110 and 140. A packet transmitted from the host interface 230 to the host 200*d* may include a response to the command or data read from each NVM 110 and 140. The memory interface 232 may transmit write data to be written to each NVM 110 and 140 to each NVM 110 and 140, or may receive read data read from each NVM 110 and 140. The memory interface 232 may be configured to comply with a standard protocol, such as Toggle or open NAND flash interface (ONFI).

The FTL 234 may perform various house keeping operations, such as address mapping, wear-leveling, garbage collection, etc. Here, the address mapping operation may be an operation that converts a logical address received from the host 200*d* into a corresponding physical address used to store data in each NVM 110 and 140. The wear-leveling operation may be used to reduce or prevent excessive localized memory cell deterioration (e.g.,) in relation to various memory blocks. The wear-leveling operation may be implemented using firmware to balance erase counts across physical blocks. The garbage collection operation may ensure that the usable data storage capacity for each of NVM 110 and 140 is maintained at an appropriate level by copying (and consolidating) valid data among two or more block, and then erasing one or more blocks to provide new blocks.

The packet manager 235 may generate a packet in accordance with a data communications protocol supported by an interface and consented by the host 200*d*, or parse various types of information from the packet received from the host 200*d*. In addition, the buffer memory 130 may store write data to be written to each NVM 110 and 140, may store read data read from each NVM 110 and 140, or may be used for an internal operation. Although the buffer memory 130 may be a component included in each storage controller 120 and 150, the buffer memory 130 may be outside each storage controller 120 and 150.

The interface unit 236 may be used to communicate with other memory subsystem(s) or other storage controller(s). In some embodiments, the interface unit 236 may a ccNUMA unit, a CCIX unit, a CXL unit, etc.

The ECC engine 237 may be used to perform error detection and/or correction operations on read data retrieved from each NVM 110 and 140. For example, the ECC engine 237 may generate parity bits for write data to be written to each NVM 110 and 140, and the generated parity bits may be stored in each NVM 110 and 140 together with write data. During the reading of data from each NVM 110 and 140, the ECC engine 237 may correct an error in the read data by using the parity bits read from each NVM 110 and 140 along with the read data, and output error-corrected read data.

The AES engine 238 may perform at least one of an encryption operation and a decryption operation on data input to each storage controller 120 and 150 by using a symmetric-key algorithm.

Figure 11:
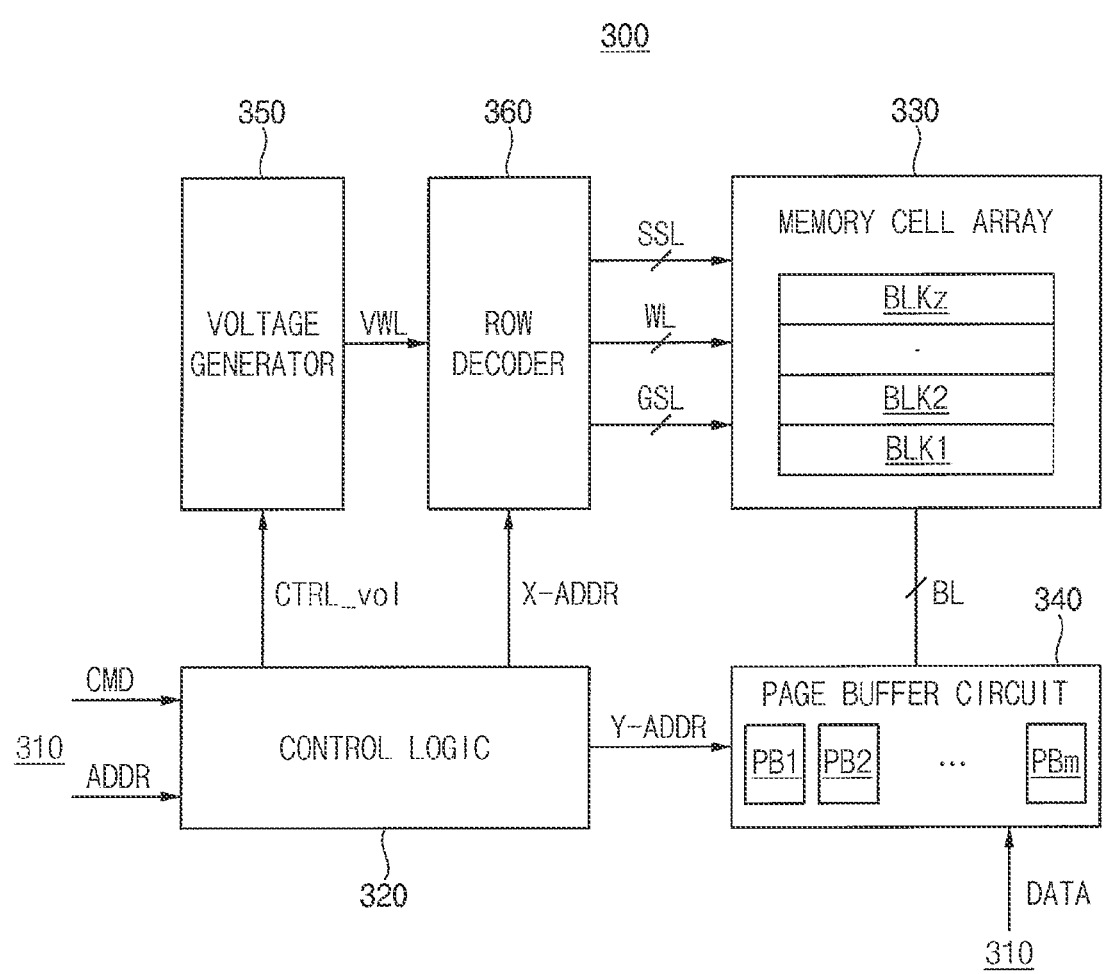
FIG. 11 is a block diagram illustrating in one example a NVM that may be included in a storage device according to embodiments of the inventive concepts.

FIG. 11 is a block diagram further illustrating in one example a NVM 300 that may be included in a storage device according to embodiments of the inventive concept.

Referring to FIG. 11, the NVM 300 may include a memory cell array 330, and a control circuit that performs an operation for the memory cell array 330. The control circuit may include a control logic circuitry 320, a page buffer circuit 340, a voltage generator 350 and a row decoder 360. The NVM 300 may also include an interface circuitry 310. In addition, the NVM 300 may further include column logic, a pre-decoder, a temperature sensor, a command decoder, and/or an address decoder.

The control logic circuitry 320 may control various operations performed by the NVM 300. The control logic circuitry 320 may output various control signals in response to commands CMD and/or addresses ADDR from the interface circuitry 310. For example, the control logic circuitry 320 may output a voltage control signal CTRL_vol, a row address X-ADDR, and a column address Y-ADDR.

The memory cell array 330 may include a plurality of memory blocks BLK1 to BLKz, wherein 'z' is a positive integer. Here, each of the plurality of memory blocks BLK1 to BLKz may include a plurality of memory cells. The memory cell array 330 may be connected to the page buffer circuit 340 through bitlines BL and be connected to the row decoder 360 through wordlines WL, string selection lines SSL, and ground selection lines GSL.

In some embodiments, the memory cell array 330 may include a 3D memory cell array, which includes a plurality of NAND strings. Each of the NAND strings may include memory cells respectively connected to wordlines vertically stacked on a substrate. In this regard, the collectively subject matter of U.S. Pat. Nos. 7,679,133; 8,553,466; 8,654,587; 8,559,235; as well as published U.S. Patent Application. No. 2011/0233648 is hereby incorporated by reference in its entirety. In some embodiments, the memory cell array 330 may include a 2D memory cell array, which includes a plurality of NAND strings arranged in a row direction and a column direction.

The page buffer circuit 340 may include a plurality of page buffers PB1 to PBm, wherein 'm' is an integer greater than or equal to 3. Here, the plurality of page buffers PB1 to PBm may be respectively connected to the memory cells through a plurality of bitlines BL. The page buffer circuit 340 may select at least one of the bitlines BL in response to the column address Y-ADDR. The page buffer circuit 340 may operate as a write driver or a sense amplifier according to an operation mode. For example, during a program operation, the page buffer circuit 340 may apply a bitline voltage corresponding to data to be programmed, to the selected bitline. During a read operation, the page buffer circuit 340 may sense a current or a voltage of the selected bitline BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and an erase voltage as a wordline voltage VWL.

The row decoder 360 may select one of a plurality of wordlines WL and select one of a plurality of string selection lines SSL in response to the row address X-ADDR. For example, the row decoder 360 may apply the program voltage and the program verification voltage to the selected wordline WL during a program operation and apply the read voltage to the selected word line WL during a read operation.

Figure 12:
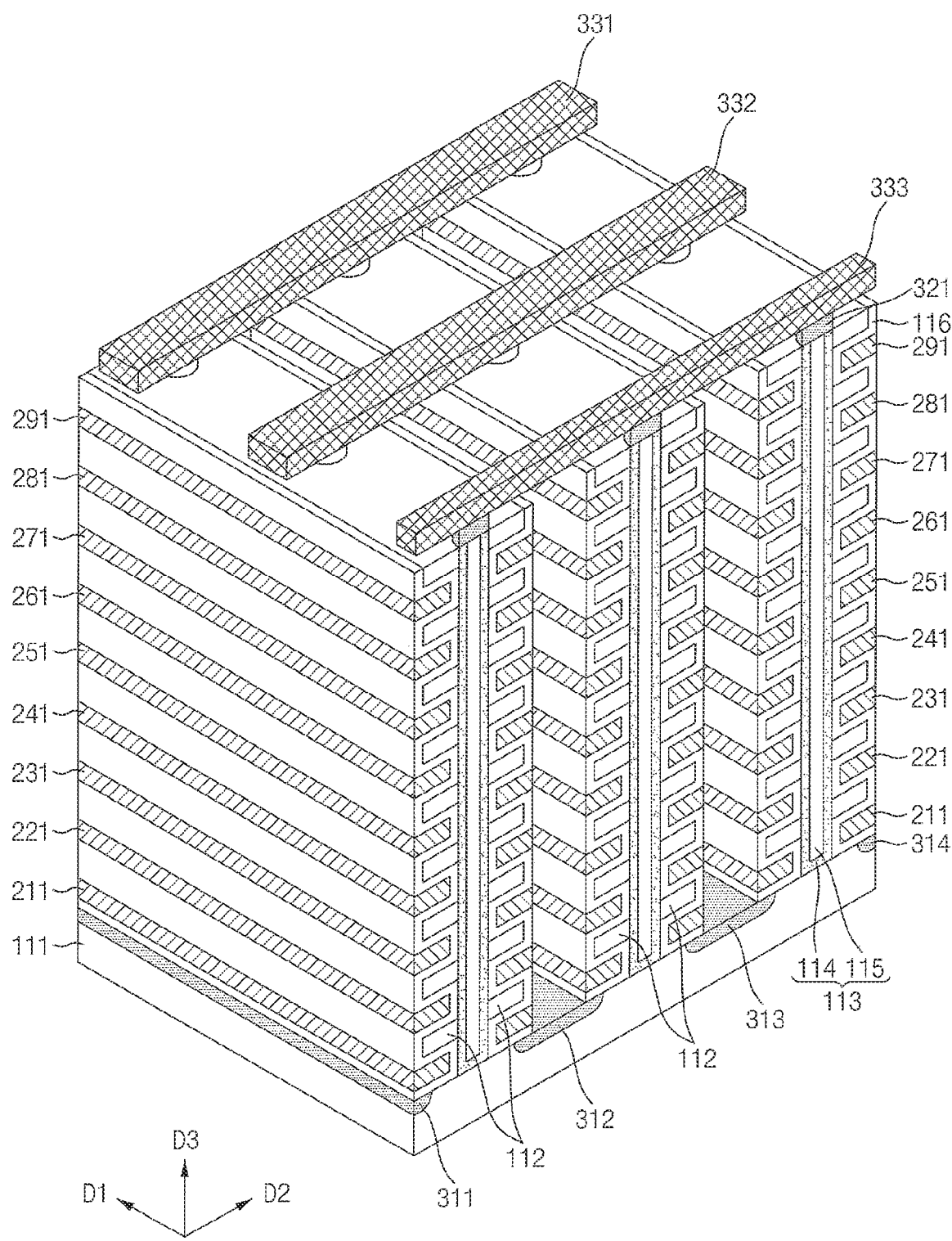
FIG. 12 is a perspective view illustrating in one example a memory block that may be included in the memory cell array of the NVM of FIG. 11.

FIG. 12 is a perspective diagram illustrating in one example a memory block BLKi of the memory cell array 330 in the NVM 300 of FIG. 11.

Referring to FIG. 12, the memory block BLKi includes a plurality of cell strings (e.g., a plurality of vertical NAND strings) which are formed on a substrate in a three-dimensional structure (or a vertical structure). The memory block BLKi includes structures extending along first, second and third directions D1, D2 and D3.

For example, a substrate 111 may be provided with a well of a first type of charge carrier impurity (e.g., a first conductivity type). For example, the substrate 111 may have a P-well formed by implanting a group 3 element such as boron (B). In particular, the substrate 111 may have a pocket P-well provided within an n-well. In some embodiments, the substrate 111 has a P-type well (or a P-type pocket well). However, the conductivity type of the substrate 111 is not limited to P-type.

A plurality of doping regions 311, 312, 313 and 314 arranged along the second direction D2 are provided in/on the substrate 111. Such doping regions 311 to 314 may have a second type of charge carrier impurity (e.g., a second conductivity type) different from the first type of the substrate 111. In some embodiments of the inventive concepts, the first to fourth doping regions 311 to 314 may have N-type. However, the conductivity type of the first to fourth doping regions 311 to 314 is not limited to N-type.

A plurality of insulation materials 112 extending along the first direction D1 are sequentially provided along the third direction D3 on a region of the substrate 111 between the first and second doping regions 311 and 312. For example, the plurality of insulation materials 112 are provided along the third direction D3, being spaced by a specific distance. For example, the insulation materials 112 may include or may be formed of an insulation material such as an oxide layer.

A plurality of pillars 113 penetrating the insulation materials 112 along the third direction D3 are sequentially disposed along the first direction D1 on a region of the substrate 111 between the first and second doping regions 311 and 312. For example, the plurality of pillars 113 penetrates the insulation materials 112 to contact the substrate 111.

In some embodiments, each pillar 113 may include a plurality of materials. For example, a channel layer 114 of each pillar 113 may include or may be formed of a silicon material having a first conductivity type. For example, the channel layer 114 of each pillar 113 may include or may be formed of a silicon material having the same conductivity type as the substrate 111. In some embodiments of the inventive concepts, the channel layer 114 of each pillar 113 includes or is formed of P-type silicon. However, the channel layer 114 of each pillar 113 is not limited to the P-type silicon.

An internal material 115 of each pillar 113 includes an insulation material. For example, the internal material 115 of each pillar 113 may include or may be formed of an insulation material such as a silicon oxide. In some examples, the internal material 115 of each pillar 113 may include an air gap. In this context, the term "air" denotes atmospheric air, or one or more gases that may be present during the manufacturing process.

An insulation layer 116 is provided along the exposed surfaces of the insulation materials 112, the pillars 113, and the substrate 111, on a region between the first and second doping regions 311 and 312. For example, the insulation layer 116 provided on surfaces of the insulation material 112 may be interposed between pillars 113 and a plurality of stacked first conductive materials 211, 221, 231, 241, 251, 261, 271, 281 and 291, as illustrated in FIG. 12. In some embodiments, the insulation layer 116 need not be provided between the first conductive materials 211 to 291 corresponding to ground selection lines GSL (e.g., 211) and string selection lines SSL (e.g., 291). For example, the ground selection lines GSL are the lowermost ones of the stack of first conductive materials 211 to 291 and the string selection lines SSL are the uppermost ones of the stack of first conductive materials 211 to 291.

The plurality of first conductive materials 211 to 291 are provided on surfaces of the insulation layer 116, in a region between the first and second doping regions 311 and 312. For example, the first conductive material 211 extending along the first direction D1 is provided between the insulation material 112 adjacent to the substrate 111 and the substrate 111. That is, the first conductive material 211 extending along the first direction D1 is provided between the insulation layer 116 at the bottom of the insulation material 112 adjacent to the substrate 111 and the substrate 111.

A first conductive material 211 extending along the first direction D1 is provided between the insulation layer 116 at the top of a specific insulation material among the insulation materials 112 and the insulation layer 116 at the bottom of the specific insulation material among the insulation materials 112. For example, a plurality of first conductive materials 221 to 281 extending along the first direction D1 are provided between the insulation materials 112 and it may be understood that the insulation layer 116 is provided between the insulation materials 112 and the first conductive materials 221 to 281. The first conductive materials 211 to 291 may be formed of a conductive metal, but in some embodiments of the inventive concepts the first conductive materials 211 to 291 may include or may be formed of a conductive material such as a polysilicon.

The same structures as those on the first and second doping regions 311 and 312 may be provided in a region between the second and third doping regions 312 and 313. In the region between the second and third doping regions 312 and 313, a plurality of insulation materials 112 are provided, which extend along the first direction D1. A plurality of pillars 113 is provided that are disposed sequentially along the first direction D1 and penetrate the plurality of insulation materials 112 along the third direction D3. An insulation layer 116 is provided on the exposed surfaces of the plurality of insulation materials 112 and the plurality of pillars 113, and a plurality of first conductive materials 211 to 291 extend along the first direction D1. Similarly, the same structures as those on the first and second doping regions 311 and 312 may be provided in a region between the third and fourth doping regions 313 and 314.

A plurality of drain regions 321 are provided on the plurality of pillars 113, respectively. The drain regions 321 may include or may be formed of silicon materials doped with a second type of charge carrier impurity. For example, the drain regions 321 may include or may be formed of silicon materials doped with an N-type dopant. In some embodiments, the drain regions 321 include or are formed of N-type silicon materials. However, the drain regions 321 are not limited to N-type silicon materials.

On the drain regions, a plurality of second conductive materials 331, 332 and 333 are provided, which extend along the second direction D2. The second conductive materials 331 to 333 are disposed along the first direction D1, being spaced apart from each other by a specific distance. The second conductive materials 331 to 333 are respectively connected to the drain regions 321 in a corresponding region. The drain regions 321 and the second conductive material 333 extending along the second direction D2 may be connected through each contact plug. Each contact plug may be, for example, a conductive plug formed of a conductive material such as a metal. The second conductive materials 331 to 333 may include or may be formed of metal materials. The second conductive materials 331 to 333 may include or may be formed of conductive materials such as a polysilicon.

In the illustrated example of FIG. 12, the first conductive materials 211 to 291 may be used to form the wordlines WL, the string selection lines SSL and the ground selection lines GSL. For example, the first conductive materials 221 to 281 may be used to form the wordlines WL, where conductive materials belonging to the same layer may be interconnected. The second conductive materials 331 to 333 may be used to form the bitlines BL. The number of layers of the first conductive materials 211 to 291 may be changed variously according to process and control techniques.

Figure 13:
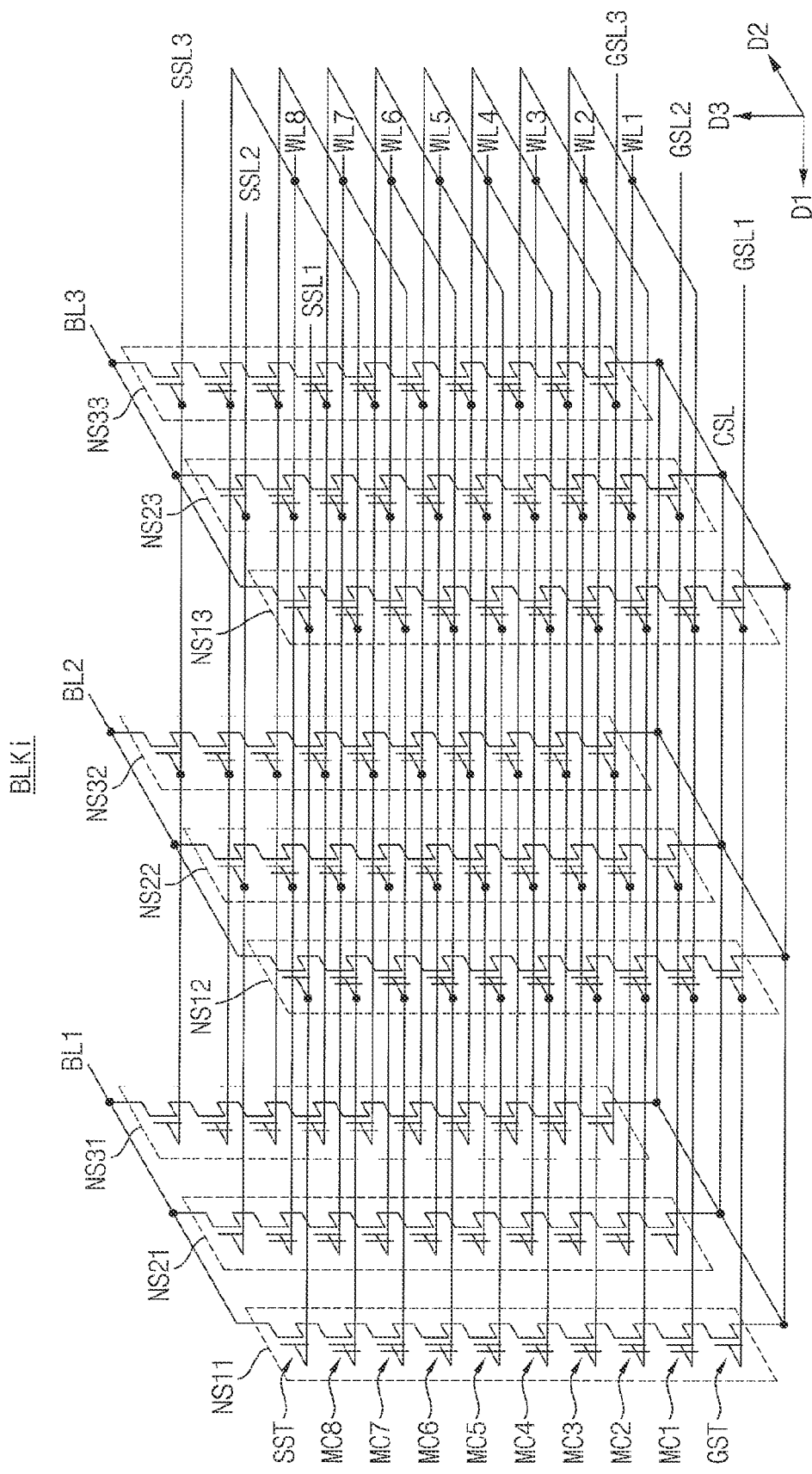
FIG. 13 is a circuit diagram illustrating in part an equivalent circuit for the memory block of FIG. 12.

FIG. 13 is a circuit diagram illustrating in part an equivalent circuit for the memory block BLKi of FIG. 12.

Here, the memory block BLKi has is a 3D memory block having a 3D structure formed on a substrate. For example, a plurality of memory NAND strings included in the memory block BLKi may be formed in a vertical direction to the substrate.

Referring to FIG. 13, the memory block BLKi may include a plurality of memory NAND strings (e.g., NS11 to NS33), which are connected between bitlines BL1, BL2, and BL3 and a common source line CSL. Each of the memory NAND strings NS11 to NS33 may include a string selection transistor SST, a plurality of memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 12, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of word lines WL1, WL2, . . . , and WL8. Some of the word lines WL1, WL2, . . . , and WL8 may correspond to dummy wordlines. The ground selection transistor GST may be connected to ground selection lines GSL1, GSL2, and GSL3 corresponding thereto. The string selection transistor SST may be connected to the bitlines BL1, BL2, and BL3 corresponding thereto, and the ground selection transistor GST may be connected to the common source line CSL.

Wordlines (e.g., WL1) at the same level may be connected in common, and the ground selection lines GSL1, GSL2, and GSL3 and the string selection lines SSL1, SSL2, and SSL3 may be separated from each other. FIG. 13 shows an example in which a memory block BLKi is connected to eight word lines WL1, WL2, . . . , and WL8 and three bitlines BL1, BL2, and BL3, without being limited thereto.

The number of the wordlines WL1 to WL8, the number of the bitlines BL1 to BL3, and the number of memory cells MC1 to MC8 are not limited to the example of FIG. 13.

Figure 14:
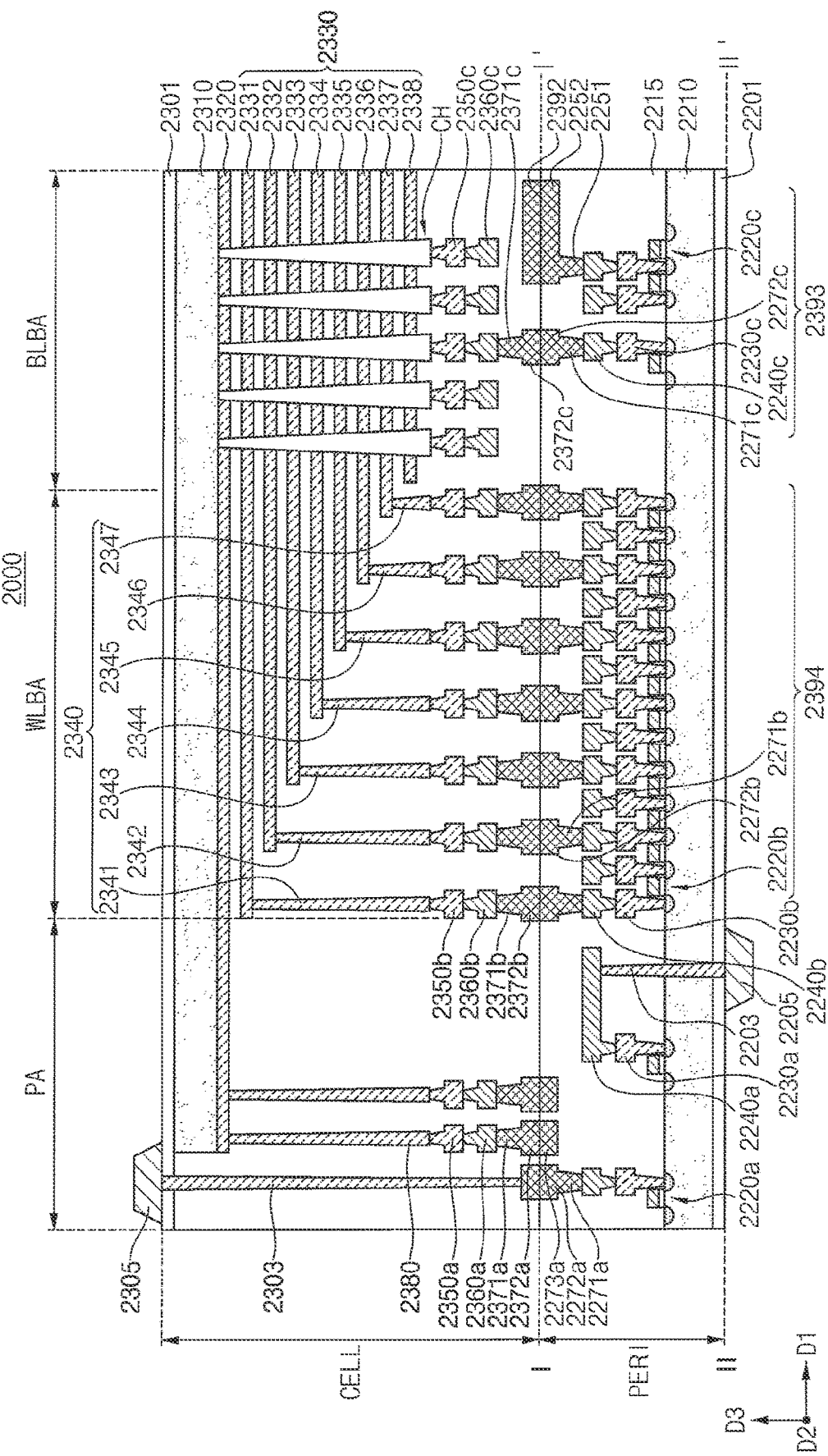
FIG. 14 is a cross-sectional diagram illustrating a NVM that may be included in a storage device according to embodiments of the inventive concepts.

FIG. 14 is a cross-sectional diagram illustrating a NVM 2000 that may be included in a storage device according to embodiments of the inventive concept.

Referring to FIG. 14, the NVM 2000 may have a chip-to-chip (C2C) structure. The C2C structure may refer to a structure formed by manufacturing an upper chip including a memory cell region or a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, the bonding metals may include copper (Cu) using a Cu-to-Cu bonding, however, the scope of the inventive concept is not limited thereto. For example, the bonding metals may also be formed of aluminum (Al) or tungsten (W).

Each of the peripheral circuit region PERI and the cell region CELL of the NVM 2000 may include an external pad bonding area PA, a wordline bonding area WLBA, and a bitline bonding area BLBA.

The peripheral circuit region PERI may include a first substrate 2210, an interlayer insulating layer 2215, a plurality of circuit elements 2220a, 2220b, and 2220c formed on the first substrate 2210, first metal layers 2230a, 2230b, and 2230c respectively connected to the plurality of circuit elements 2220a, 2220b, and 2220c, and second metal layers 2240a, 2240b, and 2240c formed on the first metal layers 2230a, 2230b, and 2230c. In some embodiments, the first metal layers 2230a, 2230b, and 2230c may be formed of tungsten having relatively high electrical resistivity, and the second metal layers 2240a, 2240b, and 2240c may be formed of copper having relatively low electrical resistivity.

In the illustrated embodiment of FIG. 14, although only the first metal layers 2230a, 2230b, and 2230c and the second metal layers 2240a, 2240b, and 2240c are shown and described, however, the scope of the inventive concept is not limited thereto, and one or more additional metal layers may be further formed on the second metal layers 2240a, 2240b, and 2240c. At least a portion of the one or more additional metal layers formed on the second metal layers 2240a, 2240b, and 2240c may be formed of aluminum or the like having a lower electrical resistivity than those of copper forming the second metal layers 2240a, 2240b, and 2240c.

The interlayer insulating layer 2215 may be disposed on the first substrate 2210 and cover the plurality of circuit elements 2220a, 2220b, and 2220c, the first metal layers 2230a, 2230b, and 2230c, and the second metal layers 2240a, 2240b, and 2240c. The interlayer insulating layer 2215 may include an insulating material such as silicon oxide, silicon nitride, or the like.

Lower bonding metals 2271b and 2272b may be formed on the second metal layer 2240b in the wordline bonding area WLBA. In the wordline bonding area WLBA, the lower bonding metals 2271b and 2272b in the peripheral circuit region PERI may be electrically bonded to upper bonding metals 2371b and 2372b of the cell region CELL. The lower bonding metals 2271b and 2272b and the upper bonding metals 2371b and 2372b may be formed of aluminum, copper, tungsten, or the like. Further, the upper bonding metals 2371b and 2372b in the cell region CELL may be referred to as first metal pads and the lower bonding metals 2271b and 2272b in the peripheral circuit region PERI may be referred as second metal pads.

The cell region CELL may include at least one memory block. The cell region CELL may include a second substrate 2310 and a common source line 2320. On the second substrate 2310, a plurality of wordlines 2331 to 2338 (e.g., 2330) may be stacked in a third direction D3 (e.g., a Z-axis direction), perpendicular to an upper surface of the second substrate 2310. At least one string selection line and at least one ground selection line may be arranged on and below the plurality of wordlines 2330, respectively, and the plurality of wordlines 2330 may be disposed between the at least one string selection line and the at least one ground selection line.

In the bitline bonding area BLBA, a channel structure CH may extend in the third direction D3 (e.g., the Z-axis direction), perpendicular to the upper surface of the second substrate 2310, and pass through the plurality of wordlines 2330, the at least one string selection line, and the at least one ground selection line. The channel structure CH may include a data storage layer, a channel layer, a buried insulating layer, and the like, and the channel layer may be electrically connected to a first metal layer 2350c and a second metal layer 2360c. For example, the first metal layer 2350c may be a bitline contact, and the second metal layer 2360c may be a bitline. In some embodiments, the bitline 2360c may extend in a second direction D2 (e.g., a Y-axis direction), parallel to the upper surface of the second substrate 2310.

In the illustrated embodiment of FIG. 17, an area in which the channel structure CH, the bitline 2360c, and the like are disposed may be defined as the bitline bonding area BLBA. In the bitline bonding area BLBA, the bitline 2360c may be electrically connected to the circuit elements 2220c providing a page buffer 2393 in the peripheral circuit region PERI. The bitline 2360c may be connected to upper bonding metals 2371c and 2372c in the cell region CELL, and the upper bonding metals 2371c and 2372c may be connected to lower bonding metals 2271c and 2272c connected to the circuit elements 2220c of the page buffer 2393.

In the wordline bonding area WLBA, the plurality of wordlines 2330 may extend in a first direction D1 (e.g., an X-axis direction), parallel to the upper surface of the second substrate 2310 and perpendicular to the second direction D2, and may be connected to a plurality of cell contact plugs 2341 to 2347 (e.g., 2340). The plurality of wordlines 2330 and the plurality of cell contact plugs 2340 may be connected to each other in pads provided by at least a portion of the plurality of wordlines 2330 extending in different lengths in the first direction D1. A first metal layer 2350b and a second metal layer 2360b may be connected to an upper portion of the plurality of cell contact plugs 2340 connected to the plurality of wordlines 2330, sequentially. The plurality of cell contact plugs 2340 may be connected to the peripheral circuit region PERI by the upper bonding metals 2371b and 2372b of the cell region CELL and the lower bonding metals 2271b and 2272b of the peripheral circuit region PERI in the wordline bonding area WLBA. In some embodiments, bonding metals 2251 and 2252 of the peripheral circuit area PERI may be connected to the cell area CELL through the bonding metal 2392 of the cell area CELL The plurality of cell contact plugs 2340 may be electrically connected to the circuit elements 2220b forming a row decoder 2394 in the peripheral circuit region PERI. In some embodiments, operating voltages of the circuit elements 2220b forming the row decoder 2394 may be different than operating voltages of the circuit elements 2220c forming the page buffer 2393. For example, operating voltages of the circuit elements 2220c forming the page buffer 2393 may be greater than operating voltages of the circuit elements 2220b forming the row decoder 2394.

A common source line contact plug 2380 may be disposed in the external pad bonding area PA. The common source line contact plug 2380 may be formed of a conductive material such as a metal, a metal compound, polysilicon, or the like, and may be electrically connected to the common source line 2320. A first metal layer 2350a and a second metal layer 2360a may be stacked on an upper portion of the common source line contact plug 2380, sequentially. For example, an area in which the common source line contact plug 2380, the first metal layer 2350a, and the second metal layer 2360a are disposed may be defined as the external pad bonding area PA. The second metal layer 2360a may be electrically connected to the upper metal via 2371a. The upper metal via 2371a may be electrically connected to the upper metal pattern 2372a.

Input/output pads 2205 and 2305 may be disposed in the external pad bonding area PA. A lower insulating film 2201 covering a lower surface of the first substrate 2210 may be formed below the first substrate 2210, and a first input/output pad 2205 may be formed on the lower insulating film 2201. The first input/output pad 2205 may be connected to at least one of the plurality of circuit elements 2220a, 2220b, and 2220c disposed in the peripheral circuit region PERI through a first input/output contact plug 2203, and may be separated from the first substrate 2210 by the lower insulating film 2201. In addition, a side insulating film may be disposed between the first input/output contact plug 2203 and the first substrate 2210 to electrically separate the first input/output contact plug 2203 and the first substrate 2210.

An upper insulating film 2301 covering the upper surface of the second substrate 2310 may be formed on the second substrate 2310, and a second input/output pad 2305 may be disposed on the upper insulating film 2301. The second input/output pad 2305 may be connected to at least one of the plurality of circuit elements 2220a, 2220b, and 2220c disposed in the peripheral circuit region PERI through a second input/output contact plug 2303. In some embodiments, the second input/output pad 2305 is electrically connected to the circuit element 2220a disposed in the peripheral circuit area PERI through the second input and output contact plug 2303, the lower metal pattern 2272a, and the lower metal via 2271a.

In some embodiments, the second substrate 2310 and the common source line 2320 may not be disposed in an area in which the second input/output contact plug 2303 is disposed. Also, the second input/output pad 2305 may not overlap the wordlines 2330 in the third direction D3 (e.g., the Z-axis direction). The second input/output contact plug 2303 may be separated from the second substrate 2310 in the direction, parallel to the upper surface of the second substrate 2310, and may pass through the interlayer insulating layer of the cell region CELL to be connected to the second input/output pad 2305.

In some embodiments, the first input/output pad 2205 and the second input/output pad 2305 may be selectively formed. For example, the NVM 2000 may include only the first input/output pad 2205 disposed on the first substrate 2210 or the second input/output pad 2305 disposed on the second substrate 2310. In some embodiments, the NVM 2000 may include both the first input/output pad 2205 and the second input/output pad 2305.

A metal pattern provided on an uppermost metal layer may be provided as a dummy pattern or the uppermost metal layer may be absent, in each of the external pad bonding area PA and the bitline bonding area BLBA, respectively included in the cell region CELL and the peripheral circuit region PERI.

In the external pad bonding area PA, the NVM 2000 may include a lower metal pattern 2273a, corresponding to an upper metal pattern 2372a formed in an uppermost metal layer of the cell region CELL, and having the same cross-sectional shape as the upper metal pattern 2372a of the cell region CELL so as to be connected to each other, in an uppermost metal layer of the peripheral circuit region PERI. In the peripheral circuit region PERI, the lower metal pattern 2273a formed in the uppermost metal layer of the peripheral circuit region PERI may not be connected to a contact. Similarly, in the external pad bonding area PA, the upper metal pattern 2372a, corresponding to the lower metal pattern 2273a formed in an uppermost metal layer of the peripheral circuit region PERI, and having the same shape as the lower metal pattern 2273a of the peripheral circuit region PERI, may be formed in an uppermost metal layer of the cell region CELL.

The lower bonding metals 2271b and 2272b may be formed on the second metal layer 2240b in the wordline bonding area WLBA. In the wordline bonding area WLBA, the lower bonding metals 2271b and 2272b of the peripheral circuit region PERI may be electrically connected to the upper bonding metals 2371b and 2372b of the cell region CELL by a Cu-to-Cu bonding.

Further, in the bitline bonding area BLBA, an upper metal pattern 2392, corresponding to a lower metal pattern 2252 formed in the uppermost metal layer of the peripheral circuit region PERI, and having the same cross-sectional shape as the lower metal pattern 2252 of the peripheral circuit region PERI, may be formed in an uppermost metal layer of the cell region CELL. A contact may not be formed on the upper metal pattern 2392 formed in the uppermost metal layer of the cell region CELL.

In some embodiments, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

The inventive concept may be applied to various storage devices and systems that include the storage devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable electronic device, an internet of things (IoT) device, an internet of everything (IoE) device, an e-book reader, a virtual reality (VR) device, an augmented reality (AR) device, a robotic device, a drone, etc.

The foregoing embodiments are presented as illustrative of other embodiments of the inventive concept. And although some example embodiments have been described above, those skilled in the art will readily appreciate that many modifications are possible in relation to same without materially departing from the scope of the inventive concept as defined by the following claims.

What is claimed is:

1. A storage device comprising:
a first memory subsystem mounted on a substrate, the first memory subsystem including a first nonvolatile memory device (NVM), a first controller chip, and a first buffer memory chip separate from the first controller chip, wherein the first controller chip comprises a first storage controller and a first cache memory, wherein the first buffer memory chip comprises a first buffer memory distinct from the first cache memory, and wherein the first storage controller is configured to control operation of the first NVM; and
a second memory subsystem distinct from the first memory subsystem and mounted on the substrate, the second memory subsystem including a second NVM, a second controller chip, and a second buffer memory chip separate from the second controller chip, wherein the second controller chip includes a second storage controller and a second cache memory, wherein the second buffer memory chip includes a second buffer memory distinct from the second cache memory, and wherein the second storage controller is configured to control operation of the second NVM,
wherein the first storage controller and the second storage controller are configured to perform a first read operation comprising:
receiving, by the first storage controller, from a host, a read request requesting read data stored in a memory cell in the second NVM, and
based on receiving the read request, transferring, by the first storage controller, read request information related to the read request to the second storage controller,
based on the read request information, storing, by the second storage controller the read data in the second buffer memory by reading the read data from the second NVM,
storing, by the second storage controller, storage state information, indicating that the read data are stored in the second buffer memory, in the second cache memory
accessing, by the first storage controller, the second cache memory and checking, by the first storage controller, the storage state information stored in the second cache memory, and
based on the storage state information, accessing, by the first storage controller, the second buffer memory and providing, by the first storage controller, the read data to the host by reading the read data from the second buffer memory,
wherein the first storage controller and the second storage controller are further configured to perform a second read operation that matches the first read operation with operations and elements of the first memory subsystem and the second memory subsystem exchanged.

2. The storage device of claim 1, wherein the first buffer memory is configured to store data communicated between the first storage controller and the first NVM.

3. The storage device of claim 1, wherein the first storage controller is configured to set at least a portion of the first NVM and at least a portion of the second NVM as a namespace region in response to a namespace generation request received from the host.

4. The storage device of claim 1, wherein the first storage controller is configured to set at least a portion of the second NVM as a namespace region in response to a namespace generation request received from the host.

5. The storage device of claim 1, wherein the first memory subsystem includes a first interface unit,
wherein the second memory subsystem includes a second interface unit,
wherein the first interface unit and the second interface unit are directly connected,
wherein the first storage controller is configured to access at least one of the second cache memory, the second buffer memory, or the second NVM via the first interface unit and the second interface unit, and
wherein the second storage controller is configured to access at least one of the first cache memory, the first buffer memory, or the first NVM via the second interface unit and the first interface unit.

6. The storage device of claim 5, wherein each of the first interface unit and the second interface unit is a cache-coherent non-uniform memory access (ccNUMA) unit.

7. The storage device of claim 1, wherein the first memory subsystem includes a first mapping table,
wherein the second memory subsystem includes a second mapping table, wherein the first storage controller is configured to, based on receiving a write request including write data, the write request indicating that the write data is to be stored in a second memory cell in the second NVM:
transfer write request information associated with the write request to the second storage controller,
store write data in the first buffer memory, and
store storage state information, indicating that the write data are stored in the first buffer memory, in the first cache memory, and
wherein the second storage controller is configured to:
access the first cache memory and check the storage state information stored in the first cache memory based on the write request information, and
access the first buffer memory and write the write data stored in the first buffer memory to the second NVM based on the storage state information.

8. The storage device of claim 7, wherein the second storage controller is configured to, after the write data are written to the second NVM:
update the second mapping table; and
transfer write completion information to the first storage controller, and
the first storage controller is configured to:
update the first mapping table based on the write completion information; and
transfer a write completion response.

9. The storage device of claim 8, wherein the second storage controller is configured to update the second mapping table such that the second mapping table stores a second physical address corresponding to a logical address included in the write request, a NVM identifier indicating the second NVM, and an address of a region of the second NVM in which the write data are stored, and the first storage controller is configured to update the first mapping table such that the first mapping table stores a first physical address corresponding to the logical address included in the write request, and the NVM identifier indicating the second NVM.

10. A method of operating a storage device including:
a first memory subsystem mounted on a substrate, the first memory subsystem including a first nonvolatile memory device (NVM), a first controller chip, and a first buffer memory chip separate from the first controller chip, wherein the first controller chip comprises a first mapping table, a first cache memory, and a first storage controller configured to control operation of the first NVM, and wherein the first buffer memory chip comprises a first buffer memory distinct from the first cache memory; and
a second memory subsystem distinct from the first memory subsystem and mounted on the substrate, the second memory subsystem including a second NVM, a second controller chip, and a second buffer memory chip separate from the second controller chip, wherein the second controller chip includes a second storage controller, a second cache memory, and a second mapping table, wherein the second buffer memory chip includes a second buffer memory distinct from the second cache memory, and wherein the second storage controller is configured to control operation of the second NVM,
the method comprising a first write operation comprising:
receiving, at the first storage controller, from a host, a write request including write data, the write request indicating that the write data is to be stored in a memory cell in the second NVM;
using the first storage controller to write the write data in the first buffer memory; and thereafter,
using the first storage controller to transfer write request information associated with the write request to the second storage controller,
using the first storage controller to store storage state information, indicating that the write data are stored in the first buffer memory, in the first cache memory,
using the second storage controller to access the first cache memory and check the storage state information stored in the first cache memory based on the write request information, and
using the second storage controller to access the first buffer memory and write the write data stored in the first buffer memory in the second NVM based on the storage state information,
wherein the method further comprises a second write operation that matches the first write operation with operations and elements of the first memory subsystem and the second memory subsystem exchanged.

11. The method of claim 10, further comprising:
after the write data are written to the second NVM, using the second storage controller to update the second mapping table;
using the second storage controller to transfer write completion information to the first storage controller;
using the first storage controller to update the first mapping table in response to the write completion information; and
using the first storage controller to transfer a write completion response.

12. The method of claim 11, wherein the second mapping table is updated such that the second mapping table stores as a second physical address corresponding to a logical address included in the write request, a NVM identifier indicating the second NVM, and an address of a region of the second NVM in which the write data are stored, and the first mapping table is updated such that the first mapping table stores as a first physical address corresponding to the logical address included in the write request, the NVM identifier indicating the second NVM.

13. The method of claim 10, further comprising:

receiving, at the first storage controller, a read request directed to a second memory cell in the second NVM;

using the second storage controller to store read data in the second buffer memory by reading the read data from the second NVM; and using the first storage controller to provide the read data by reading the read data from the second buffer memory.

14. The method of claim 13, further comprising:

using the first storage controller to transfer read request information associated with the read request to the second storage controller, wherein storing the read data in the second buffer memory includes using the second storage controller to read the read data from the second NVM based on the read request information and the second mapping table.

15. The method of claim 13, further comprising:

using the second storage controller to store second storage state information, indicating that the read data are stored in the second buffer memory, in the second cache memory;

using the first storage controller to check the second storage state information stored in the second cache memory; and using the first storage controller to provide the read data by reading the read data from the second buffer memory based on the second storage state information.

16. A system comprising:

a host; and a storage device connected to the host and operating under control of the host, wherein the storage device includes:

a first memory subsystem mounted on a substrate, the first memory subsystem including a first nonvolatile memory device (NVM), a first controller chip, and a first buffer memory chip separate from the first controller chip, wherein the first controller chip comprises a first mapping table, a first cache memory, and a first storage controller configured to control operation of the first NVM, and wherein the first buffer memory chip comprises a first buffer memory distinct from the first cache memory; and a second memory subsystem distinct from the first memory subsystem and mounted on the substrate, the second memory subsystem including a second NVM, a second controller chip, and a second buffer memory chip separate from the second controller chip, wherein the second controller chip includes a second cache memory, a second mapping table, and a second storage controller configured to control operation of the second NVM, and wherein the second buffer memory chip comprises a second buffer memory distinct from the second cache memory, wherein the first storage controller and the second storage controller are configured to perform a first write operation comprising:

receiving, by the first storage controller, from the host, a write request including write data, the write request indicating that the write data is to be stored in a memory cell in the second NVM, based on receiving the write request, transferring, by the first storage controller, write request information associated with the write request to the second storage controller, storing, by the first storage controller, the write data in the first buffer memory, and storing, by the first storage controller, first storage state information, indicating that the write data are stored in the first buffer memory, in the first cache memory, accessing, by the second storage controller, based on the write request information, the first cache memory and checking the first storage state information stored in the first cache memory, and accessing, by the second storage controller, the first buffer memory and writing the write data from the first buffer memory to the second NVM based on the first storage state information, wherein the first storage controller and the second storage controller are further configured to perform a second write operation that matches the first write operation with operations and elements of the first memory subsystem and the second memory subsystem exchanged.

* * * * *